(12) United States Patent
Harvey et al.

(10) Patent No.: US 7,869,989 B1
(45) Date of Patent: Jan. 11, 2011

(54) METHODS AND APPARATUS FOR UNDERSTANDING MACHINE VOCABULARY

(75) Inventors: George H. Harvey, Brattleboro, VT (US); Donald R. Greenbaum, Duxbury, MA (US); Charles H. Collins, Ledgewood, NJ (US); Charles D. Harvey, Winchester, NH (US)

(73) Assignee: Artificial Cognition Inc., Winchester, NH (US)

( * ) Notice: Subject to any disclaimer, the term of this patent is extended or adjusted under 35 U.S.C. 154(b) by 1133 days.

(21) Appl. No.: 11/343,251

(22) Filed: Jan. 27, 2006

Related U.S. Application Data

(60) Provisional application No. 60/648,154, filed on Jan. 28, 2005.

(51) Int. Cl.
*G06F 17/21* (2006.01)
*G06F 17/20* (2006.01)
*G06F 17/27* (2006.01)
*G06F 17/22* (2006.01)
*G06F 17/24* (2006.01)

(52) U.S. Cl. .................. 704/9; 704/8; 704/10

(58) Field of Classification Search ............... 704/1–10
See application file for complete search history.

(56) References Cited

U.S. PATENT DOCUMENTS

| | | | | |
|---|---|---|---|---|
| 4,613,944 A * | 9/1986 | Hashimoto et al. | ........... | 704/277 |
| 4,724,523 A * | 2/1988 | Kucera | ........... | 715/206 |
| 5,285,386 A * | 2/1994 | Kuo | ........... | 704/2 |
| 5,307,265 A * | 4/1994 | Winans | ........... | 704/8 |
| 5,497,319 A * | 3/1996 | Chong et al. | ........... | 704/2 |
| 5,523,946 A * | 6/1996 | Kaplan et al. | ........... | 704/2 |
| 5,675,819 A * | 10/1997 | Schuetze | ........... | 704/10 |
| 5,715,468 A * | 2/1998 | Budzinski | ........... | 704/9 |
| 5,784,071 A * | 7/1998 | Tang et al. | ........... | 345/467 |
| 5,887,120 A * | 3/1999 | Wical | ........... | 706/46 |
| 5,960,384 A * | 9/1999 | Brash | ........... | 704/9 |
| 6,006,221 A * | 12/1999 | Liddy et al. | ........... | 707/5 |
| 6,088,699 A * | 7/2000 | Gampper et al. | ........... | 707/10 |
| 6,151,618 A * | 11/2000 | Wahbe et al. | ........... | 718/1 |
| 6,453,315 B1 * | 9/2002 | Weissman et al. | ........... | 707/5 |
| 6,871,174 B1 * | 3/2005 | Dolan et al. | ........... | 704/9 |
| 6,950,792 B1 * | 9/2005 | Nussbaum | ........... | 704/8 |
| 7,177,798 B2 * | 2/2007 | Hsu et al. | ........... | 704/9 |
| 7,184,597 B1 * | 2/2007 | Aronov | ........... | 382/232 |
| 7,369,984 B2 * | 5/2008 | Fairweather | ........... | 704/8 |
| 7,464,329 B2 * | 12/2008 | Relyea et al. | ........... | 715/234 |

(Continued)

*Primary Examiner*—James S Wozniak
*Assistant Examiner*—David Kovacek
(74) *Attorney, Agent, or Firm*—Chapin IP Law, LLC; Barry W. Chapin, Esq.

(57) ABSTRACT

Configurations herein provide a language processing mechanism operable to define a machine vocabulary and identify a machine language version of the words that preserves context and identifies the proper definition of the words by identifying and preserving context of a particular set of words, such as a sentence or paragraph. The machine vocabulary includes a definition section for each definition of a word. Each definition section includes a set of one or more definition elements. The definition elements include a predetermined format of definition fields, and each has a corresponding mask indicative of significant definition fields. The set of definition elements corresponding to a particular definition describe the usage of the word in a context matching that particular definition. Each definition element captures a characteristic of the definition according to fuzzy logic such that the definition elements collectively capture the context.

26 Claims, 29 Drawing Sheets

| field | bits | field usage | value for "leopard" | example value |
|---|---|---|---|---|
| CLA | 3 | Class | mechanism | 5 |
| MTD | 2 | Method | 0 | 0 |
| CAT | 5 | Category | Animal | 0Ah |
| SCO | 2 | Scope | 0 | 0 |
| NEG | 1 | Negation | positive | 0 |
| CXT | 6 | context of the word | Land | 1Ch |
| AUX1 | 6 | value to human | wild and dangerous | 37h |
| AUX2 | 6 | what it eats | animal | 29h |
| | | | | |
| ESC | 1 | Escape | continue definition | 1 |

U.S. PATENT DOCUMENTS

| | | | |
|---|---|---|---|
| 7,478,035 B1* | 1/2009 | Wrench et al. | 704/7 |
| 2003/0023420 A1* | 1/2003 | Goodman | 704/1 |
| 2004/0006457 A1* | 1/2004 | Dehlinger et al. | 704/5 |
| 2004/0073550 A1* | 4/2004 | Meirovitz et al. | 707/6 |
| 2004/0199505 A1* | 10/2004 | Calistri-Yeh et al. | 707/4 |
| 2004/0230418 A1* | 11/2004 | Kitamura | 704/8 |
| 2006/0020607 A1* | 1/2006 | Patterson | 707/100 |
| 2007/0083359 A1* | 4/2007 | Bender | 704/9 |
| 2008/0306726 A1* | 12/2008 | Levy | 704/2 |
| 2009/0138453 A1* | 5/2009 | Jee et al. | 707/4 |

* cited by examiner

Fig. 5a

| FOUNDATION, ALL METHODS, ALL SCOPES | | | |
|---|---|---|---|
| 00 existence * | 08 number * | 10 relation * | 18 order * |
| 01 intrinsic | 09 average | 11 greatness | 19 opposition |
| 02 composition | 0A formula | 12 sufficiency | 1A assemblage |
| 03 simplicity | 0B equality | 13 excess | 1B portion |
| 04 presence | 0C whole | 14 similarity | 1C sequence |
| 05 identity | 0D degree | 15 normality | 1D middle |
| 06 state | 0E plurality | 16 before, priority | 1E end |
| 07 circumstance | 0F infinity, all | 17 dependence | 1F source |
| 20 meaning * | 28 truth * | 30 intellect * | 38 judgment * |
| 21 topic | 29 secrecy | 31 affirmation | 39 sanity |
| 22 communication | 2A information | 32 thought | 3A philosophy |
| 23 command | 2B indication | 33 memory | 3B comparison |
| 24 language | 2C inquiry | 34 knowledge | 3C imagination |
| 25 teaching | 2D evidence | 35 certainty | 3D theory |
| 26 speech | 2E discovery | 36 probability | 3E belief |
| 27 writing | 2F answer | 37 wonder | 3F intuition |
| 40 feelings * | 48 attitude * | 50 custom * | 58 beauty * |
| 41 amusement | 49 compulsion | 51 title | 59 affectation |
| 42 pleasure | 4A desire | 52 respect | 5A elegance |
| 43 rejoicing | 4B will | 53 accord | 5B ornament |
| 44 love | 4C attention | 54 convention | 5C art |
| 45 kindness | 4D carefulness | 55 fashion | 5D visual art |
| 46 devotion | 4E intention | 56 courtesy | 5E literature |
| 47 courage | 4F resolution | 57 formality | 5F performance |
| 60 goodness * | 68 freedom * | 70 virtue * | 78 sanctity * |
| 61 facility | 69 safety | 71 dueness | 79 occultism |
| 62 quality | 6A peace | 72 right | 7A spirit |
| 63 importance | 6B contention | 73 duty | 7B deity |
| 64 success | 6C consent | 74 integrity | 7C religion |
| 65 preservation | 6D promise | 75 innocence | 7D worship |
| 66 improvement | 6E authority | 76 modesty | 7E theology |
| 67 perfection | 6F legality | 77 temperance | 7F scripture |

| | | | |
|---|---|---|---|
| 80 nature * | 88 attribute * | 90 matter * | 98 universe * |
| 81 advantage | 89 smell and taste | 91 particle | 99 air (001) |
| 82 field | 8A attraction | 92 chemical | 9A water (010) |
| 83 electricity | 8B weight | 93 chemical reaction | 9B stream |
| 84 force | 8C radiation | 94 atom or molecule | 9C land (100) |
| 85 potential | 8D sound | 95 gas | 9D geology |
| 86 physical reaction | 8E light | 96 liquid | 9E marsh (110) |
| 87 resistance | 8F heat | 97 solid | 9F cosmic body |
| A0 mechanism * | A8 organism * | B0 person * | B8 economy * |
| A1 tools | A9 health | B1 artist | B9 possession |
| A2 engine | AA animal | B2 human | BA organization |
| A3 vehicle | AB plant | B3 ethnic | BB market |
| A4 electronics | AC sensation | B4 worker | BC money |
| A5 radio | AD consumption | B5 representative | BD credit |
| A6 computer | AE reproduction | B6 associate | BE price |
| A7 automation | AF masculinity | B7 master | BF profit |
| C0 space * | C8 form * | D0 measure * | D8 direction * |
| C1 bounds/surface | C9 filament | D1 angularity | D9 oblique |
| C2 centrality | CA structure | D2 power | DA vertical |
| C3 exteriority | CB opening | D3 swiftness | DB horizontal |
| C4 location | CC straightness | D4 size | DC side |
| C5 way | CD circularity | D5 length | DD top |
| C6 region | CE smoothness | D6 distance | DE front |
| C7 environment | CF sharpness | D7 interval | DF right |
| E0 time * | E8 motion * | F0 event * | F8 change * |
| E1 age | E9 return | F1 reciprocation | F9 substitution |
| E2 frequency | EA travel | F2 transfer | FA means |
| E3 season | EB progression | F3 support | FB cause |
| E4 instant | EC arrival | F4 action | FC continuation |
| E5 present | ED crossing | F5 use | FD necessity |
| E6 past | EE joining | F6 endeavor | FE development |
| E7 future | EF ingress | F7 production | FF increase |

| | MTD | FND | N | SCO | CXT | AUX1 | AUX2 | found in |
|---|---|---|---|---|---|---|---|---|
| tiger | 0 | AA | 0 | 2 | 37 | 0D | 0A | root list, which has 256 values |
| animal | 0 | AA | 0 | | 37 | | | list for Class 5, method 2, CXT |
| mammal | 0 | | | 0 | | 0D | | list for Class 5, method 2, AUX1 |
| retractible claws | 0 | | | 0 | | | | |
| solitary hunter | 0 | | | 0 | | | 0A | list for Class 5, method 2, AUX2 |

Fig. 5c

CLASS 5, category AA, method 0, scope 2, CXT

| | | | |
|---|---|---|---|
| 00 | 08 | 10 worm | 18 echinoderm |
| 01 | 09 | 11 annelid | 19 starfish |
| 02 | 0A | 12 | 1A |
| 03 | 0B | 13 nematode | 1B |
| 04 | 0C | 14 | 1C |
| 05 | 0D | 15 | 1D |
| 06 | 0E | 16 | 1E |
| 07 | 0F sponge | 17 | 1F |
| 20 mollusk | 28 arthropod | 30 vertebrate | 38 |
| 21 univalve | 29 crustacean | 31 fish | 39 |
| 22 bivalve | 2A arachnid | 32 amphibian | 3A |
| 23 cephalopod | 2B myriapod | 33 reptile | 3B |
| 24 | 2C insect | 34 warm-blooded | 3C |
| 25 | 2D | 35 dinosaur | 3D |
| 26 | 2E | 36 bird | 3E |
| 27 | 2F | 37 mammal | 3F |

*Fig. 5d*

| CLASS 5, category AA, method 0, scope 2, AUX1 | | | |
|---|---|---|---|
| 00 no actual feet | 08 tough claws | 10 round | 18 tentacles |
| 01 simple shell | 09 wide paws (weasel) | 11 odd-toed hoof | 19 eight |
| 02 spiral shell | 0A medium paw (dog) | 12 even-toed hoof | 1A ten |
| 03 rough shell | 0B long paw (bear) | 13 soft toed | 1B |
| 04 concentric shell | 0C sharp claws | 14 pincers | 1C many legs |
| 05 regular grooves | 0D retractable | 15 jumping feet | 1D |
| 06 | 0E hands | 16 swimming feet | 1E 1 pair/segment |
| 07 | 0F ordinary | 17 fins | 1F 2 pairs/segment |
| 20 | 28 | 30 | 38 |
| 21 spins | 29 walking/scratching | 31 | 39 |
| 22 | 2A climbing | 32 | 3A |
| 23 | 2B perching | 33 | 3B |
| 24 | 2C wading | 34 | 3C |
| 25 no feet/tiny feet | 2D | 35 | 3D |
| 26 smaller | 2E | 36 | 3E |
| 27 larger | 2F highly adapted feet | 37 | 3F |

*Fig. 5e*

| CLASS 5, category AA, method 0, scope 2, AUX2 | | | |
|---|---|---|---|
| 00 | 08 hunter | 10 | 18 |
| 01 | 09 pack hunter | 11 | 19 |
| 02 carrion/scavenger | 0A solitary hunter | 12 | 1A |
| 03 blood sucker | 0B | 13 | 1B |
| 04 | 0C | 14 | 1C |
| 05 | 0D | 15 | 1D |
| 06 | 0E | 16 | 1E |
| 07 | 0F insect/worm eater | 17 | 1F |
| 20 seed eater | 28 mixed ground matter | 30 aqua mammal/whale | 38 |
| 21 fruit eater | 29 grazing/vegetation | 31 toothed whale | 39 protective wing set |
| 22 flower eater | 2A | 32 baleen whale | 3A |
| 23 nectar eater | 2B omnivorous | 33 | 3B |
| 24 wood/bark/twigs | 2C water food | 34 aquatic non-whale | 3C |
| 25 leaves | 2D water vegetation | 35 | 3D |
| 26 | 2E | 36 | 3E |
| 27 | 2F | 37 | 3F |

Fig. 6b

| | MTD | FND | N | SCO | CXT | AUX1 | AUX2 | found in |
|---|---|---|---|---|---|---|---|---|
| tiger | 0 | AA | 0 | 0 | 1C | 37 | 29 | root list, which has 256 values |
| animal | 0 | AA | 0 | | | | | list for Class 5, method 0, CXT |
| land animal | 0 | | | 0 | 1C | | | list for Class 5, method 0, AUX1 |
| dangerous wild | 0 | | | 0 | | 37 | | list for Class 5, method 0, AUX1 |
| eats animals | 0 | | | 0 | | | 29 | list for Class 5, method 0, AUX2 |

Fig. 5f

CLASS 5, method 0, scope 0, CXT

| | | |
|---|---|---|
| 00 | 08 information | 18 matter |
| 01 relation | 09 indication | 19 air  001 |
| 02 group | 0A communication | 1A water  010 |
| 03 all | 0B teaching | 1B [stream] |
| 04 convention/dance | 0C judgment/mind | 1C land  100 |
| 05 affection | 0D sound | 1D [geology] |
| 06 amusement/perform | 0E light | 1E marsh  110 |
| 07 art | 0F heat | 1F cosmos |
| 20 tool | 28 organism | 38 action |
| 21 vehicle | 29 plant | 39 transfer |
| 22 electronic | 2A animal | 3A support/expense |
| 23 money | 2B human | 3B use/income |
| 24 economy | 2C health | 3C attempt |
| 25 possession | 2D sensation | 3D production |
| 26 market | 2E food | 3E travel |
| 27 organization | 2F sex | 3F time |
| | 10 quality | 30 region |
| | 11 success | 31 location |
| | 12 religion/ethics | 32 bounds |
| | 13 spirit | 33 power |
| | 14 authority | 34 structure |
| | 15 legality | 35 smoothness |
| | 16 contention | 36 sharpness |
| | 17 freedom | 37 filament/direction |

CLASS 5, method 0, scope 0, AUX1

| | | |
|---|---|---|
| 00 (existence) | 08 (communication) | 10 | 18 skin structure |
| 01 number | 09 writing/telling | 11 nature | 19 slatted/barred |
| 02 opposition | 0A reading/observation | 12 thing/possession | 1A rigid sided |
| 03 relation | 0B art/imaging | 13 area | 1B soft |
| 04 reduction | 0C get | 14 (general of below) | 1C space |
| 05 good/fine | 0D respiratory | 15 action/production | 1D appearance/style |
| 06 feeling | 0E control/nerves | 16 place/put | 1E increase |
| 07 return | 0F clothes | 17 transfer | 1F general |
| 20 (for food) | 28 (military) | 30 (carrying) | 38 (time)/parts below |
| 21 production, esp food | 29 defense | 31 human like | 39 work/muscle |
| 22 preservation | 2A combat | 32 cargo | 3A moving/joints |
| 23 other food/digestive | 2B other military | 33 other carrying | 3B regulating/bones |
| 24 mechanism | 2C (government) | 34 wild | 3C immediate/exposure |
| 25 fluid/circ./lymph | 2D emergency/urgent | 35 wild, food | 3D structural |
| 26 heating | 2E law | 36 non-food value | 3E sport/amusement |
| 27 color | 2F other government | 37 dangerous | 3F other effort |

*Fig. 5g*

CLASS 5, method 0, scope 0, AUX2

| | | | |
|---|---|---|---|
| 00 (existence) | 08 (goodness) | 10 meaning | 18 (structural support) |
| 01 bonded | 09 good | 11 business | 19 hard/hard top |
| 02 number | 0A evil | 12 feelings | 1A soft/soft top |
| 03 relation | 0B polite/customary | 13 portion | 1B none/open top |
| 04 loss | 0C wood | 14 beginning | 1C young/small |
| 05 time | 0D brass/metal | 15 place | 1D old/large |
| 06 difficulty | 0E string/filament | 16 shape/size | 1E mature |
| 07 philosophy | 0F other | 17 stop | 1F value |
| 20 (power system) | 28 (organism) | 30 force | 38 fluid |
| 21 human/live | 29 animal | 31 light | 39 gas |
| 22 animal | 2A plant | 32 electric | 3A liquid |
| 23 motor/engine | 2B other organism | 33 weight/pressure | 3B deficiency |
| 24 nature | 2C (nature) | 34 heat/fire (firing) | 3C solid |
| 25 electronic | 2D chem./food (poison) | 35 vehicle/mechanical | 3D soil |
| 26 weapon (projectile) | 2E use (fatigue) | 36 sound | 3E space |
| 27 other power | 2F self (cancer) | 37 other | 3F recent |

*Fig. 5h*

| field | bits | field usage | value for "leopard" | example value |
|---|---|---|---|---|
| CLA | 3 | Class | mechanism | 5 |
| MTD | 2 | Method | 0 | 0 |
| CAT | 5 | Category | Animal | 0Ah |
| SCO | 2 | Scope | 0 | 0 |
| NEG | 1 | Negation | positive | 0 |
| CXT | 6 | context of the word | Land | 1Ch |
| AUX1 | 6 | value to human | wild and dangerous | 37h |
| AUX2 | 6 | what it eats | animal | 29h |
|  |  |  |  |  |
| ESC | 1 | Escape | continue definition | 1 |

| field | bits | field usage | value for "leopard" | value |
|---|---|---|---|---|
| CLA | 3 | Class | mechanism | 3 |
| MTD | 2 | Method | 0 | 0 |
| CAT | 5 | Category | animal | 0Ah |
| SCO | 2 | Scope | 2 | 2 |
| NEG | 1 | Negation | positive | 0 |
| CXT | 6 | Context | mammal | 37h |
| AUX1 | 6 | auxiliary 1 | sharp claws | 0Ch |
| AUX2 | 6 | auxiliary 2 | solitary hunter | 0Ah |
| ESC | 1 | escape | continued | 1 |

Fig. 8c

| field | bits | field usage | value for "leopard" | value |
|---|---|---|---|---|
| CLA | 3 | Class | mechanism | 3 |
| MTD | 2 | Method | 0 | 0 |
| CAT | 5 | Category | animal | 0Ah |
| SCO | 2 | Scope | 3 | 3 |
| NEG | 1 | Negation | positive | 0 |
| CXT | 6 | Context | retractable claws | 17h |
| AUX1 | 6 | auxiliary 1 | (none) | 00h |
| AUX2 | 6 | auxiliary 2 | spotted | 06h |
| ESC | 1 | escape | continued | 1 |

| feline | FND | MTD | SCO | NEG | CXT | AUX1 | AUX2 | ESC |
|---|---|---|---|---|---|---|---|---|
| value | AAh | 0 | 0 | 0 | 1Ch | 0 | 29h | 1 |
| means | animal | | | | land animal | - | eats animals | cont, |
| value | AAh | 0 | 2 | 0 | 37h | 0Ch | 08h | 1 |
| means | animal | | | | mammal | sharp claw | hunter | cont. |
| value | AAh | 0 | 3 | 0 | 17h | 0 | 0 | 0 |
| means | animal | | | | retractable claws | - | - | end |

Fig. 8f

| house cat | FND | MTD | SCO | NEG | CXT | AUX1 | AUX2 | ESC |
|---|---|---|---|---|---|---|---|---|
| value | AAh | 0 | 0 | 0 | 1Ch | 39 | 29h | 1 |
| means | animal | | | | land animal | worker/pet | eats animals | cont, |
| value | AAh | 0 | 2 | 0 | 37h | 0Ch | 0Ah | 1 |
| means | animal | | | | mammal | sharp claw | lone hunter | cont. |
| value | AAh | 0 | 3 | 0 | 17h | 0 | 0 | 0 |
| means | animal | | | | retractable claws | - | - | end |

Fig. 8g

| lynx | FND | MTD | SCO | NEG | CXT | AUX1 | AUX2 | ESC |
|---|---|---|---|---|---|---|---|---|
| value | AAh | 0 | 0 | 0 | 1Ch | 34h | 29h | 1 |
| means | animal | | | | land animal | wild | eats animals | cont, |
| value | AAh | 0 | 1 | 0 | 01h | - | - | 1 |
| means | animal | | | | snow/ice adapted | - | - | cont. |
| value | AAh | 0 | 2 | 0 | 37h | 0Ch | 0Ah | 1 |
| means | animal | | | | mammal | sharp claw | lone hunter | cont. |
| value | AAh | 0 | 3 | 0 | 17h | 0 | 0 | 0 |
| means | animal | | | | retractable claws | - | - | end |

Fig. 8h

| leopard | FND | MTD | SCO | NEG | CXT | AUX1 | AUX2 | ESC |
|---|---|---|---|---|---|---|---|---|
| value | AAh | 0 | 0 | 0 | 1Ch | 37h | 29h | 1 |
| means | animal | | | | land animal | wild/dangerous | eats animals | cont, |
| value | AAh | 0 | 2 | 0 | 37h | 0Ch | 0Ah | 1 |
| means | animal | | | | mammal | sharp claw | lone hunter | cont. |
| value | AAh | 0 | 3 | 0 | 17h | 0 | 06h | 0 |
| means | animal | | | | retractable claws | - | spotted | end |

Fig. 8i

| canine | FND | MTD | SCO | NEG | CXT | AUX1 | AUX2 | ESC |
|---|---|---|---|---|---|---|---|---|
| value | AAh | 0 | 0 | 0 | 1Ch | 0 | 29h | 1 |
| means | animal | | | | land animal | - | eats animals | cont, |
| value | AAh | 0 | 2 | 0 | 37h | 0Ah | 08h | 1 |
| means | animal | | | | mammal | paw | hunter | cont. |

Fig. 8j

| dog | FND | MTD | SCO | NEG | CXT | AUX1 | AUX2 | ESC |
|---|---|---|---|---|---|---|---|---|
| value | AAh | 0 | 0 | 0 | 1Ch | 39h | 29h | 1 |
| means | animal | | | | land animal | worker/pet | eats animals | cont, |
| value | AAh | 0 | 2 | 0 | 37h | 0Ah | 09h | 1 |
| means | animal | | | | mammal | paw | pack hunter | cont. |

Fig. 8k

| canine | FND | MTD | SCO | NEG | CXT | AUX1 | AUX2 | ESC |
|---|---|---|---|---|---|---|---|---|
| value | AAh | 0 | 0 | 0 | 1Ch | 37h | 29h | 1 |
| means | animal | | | | land animal | dangerous wild | eats animals | cont, |
| value | AAh | 0 | 2 | 0 | 37h | 0Ah | 09h | 1 |
| means | animal | | | | mammal | paw | pack hunter | cont. |

*Fig. 8l*

| canide | CLA | MTD | CAT | class | order | family | T0 |
|---|---|---|---|---|---|---|---|
| # of bits | 3 | 3 | 5 | 5 | 4 | 3 | 3 |
| value | 3 | 1 | 25 | 5 | 4 | 2 | 513 |
| binary | 011 | 001 | 11001 | 00101 | 0100 | 11 | 1000000001 |
| decoded | mech. | list set 1 | animal | mammal | carnivore | canidae | - |

*Fig. 8m*

| canine | CLA | MTD | CAT | class | order | family | genus | T0 |
|---|---|---|---|---|---|---|---|---|
| # of bits | 3 | 3 | 5 | 5 | 4 | 3 | 3 | 6 |
| value | 3 | 1 | 25 | 5 | 4 | 3 | 1 | 33 |
| binary | 011 | 001 | 11001 | 00101 | 0100 | 11 | 001 | 100001 |
| decoded | mech. | list set 1 | animal | mammal | carniv. | canidae | canis | - |

*Fig. 8n*

| dog | CLA | MTD | CAT | class | order | family | genus | species | T0 |
|---|---|---|---|---|---|---|---|---|---|
| # of bits | 3 | 3 | 5 | 5 | 4 | 3 | 3 | 4 | 2 |
| value | 3 | 1 | 25 | 5 | 4 | 3 | 1 | 1 | 3 |
| binary | 011 | 001 | 11001 | 00101 | 0100 | 11 | 001 | 0001 | 11 |
| decoded | mech. | list set 1 | animal | mammal | carniv. | canidae | canis | familiar. | - |

*Fig. 8o*

| wolf | CLA | MTD | CAT | class | order | family | genus | species | T0 |
|---|---|---|---|---|---|---|---|---|---|
| # of bits | 3 | 3 | 5 | 5 | 4 | 3 | 3 | 4 | 2 |
| value | 3 | 1 | 25 | 5 | 4 | 3 | 1 | 2 | 3 |
| binary | 011 | 001 | 11001 | 00101 | 0100 | 11 | 001 | 0010 | 11 |
| decoded | mech. | list set 1 | animal | mammal | carniv. | canidae | canis | lupus | - |

*Fig. 8p*

| fox | CLA | MTD | CAT | class | order | family | genus | T0 |
|---|---|---|---|---|---|---|---|---|
| # of bits | 3 | 3 | 5 | 5 | 4 | 3 | 3 | 6 |
| value | 3 | 1 | 25 | 5 | 4 | 3 | 2 | 33 |
| binary | 011 | 001 | 11001 | 00101 | 0100 | 11 | 011 | 100001 |
| decoded | mech. | list set 1 | animal | mammal | carnivore | canidae | vulpes | - |

| carnivore | CLA | MTD | CAT | class | order | T0 |
|---|---|---|---|---|---|---|
| # of bits | 3 | 3 | 5 | 5 | 4 | 3 |
| value | 3 | 1 | 25 | 5 | 4 | 2049 |
| binary | 011 | 001 | 11001 | 00101 | 0100 | 100000000001 |
| decoded | mech. | list set 1 | animal | mammal | carnivore | - |

*Fig. 8q*

| felidae | CLA | MTD | CAT | class | order | family | T0 |
|---|---|---|---|---|---|---|---|
| # of bits | 3 | 3 | 5 | 5 | 4 | 3 | 3 |
| value | 3 | 1 | 25 | 5 | 4 | 2 | 513 |
| binary | 011 | 001 | 11001 | 00101 | 0100 | 10 | 1000000001 |
| decoded | mech. | list set 1 | animal | mammal | carnivore | felidae | - |

*Fig. 8r*

| leopard | CLA | MTD | CAT | class | order | family | genus | species | T0 |
|---|---|---|---|---|---|---|---|---|---|
| # of bits | 3 | 3 | 5 | 5 | 4 | 3 | 4 | 2 | 3 |
| value | 3 | 1 | 25 | 5 | 4 | 2 | 1 | 1 | 5 |
| binary | 011 | 001 | 11001 | 00101 | 0100 | 10 | 0001 | 01 | 101 |
| decoded | mech. | list set 1 | animal | mammal | carnivore | felidae | panthera | pardus | - |

*Fig. 8s*

| lion | CLA | MTD | CAT | class | order | family | genus | species | T0 |
|---|---|---|---|---|---|---|---|---|---|
| # of bits | 3 | 3 | 5 | 5 | 4 | 3 | 4 | 2 | 3 |
| value | 3 | 1 | 25 | 5 | 4 | 2 | 1 | 2 | 5 |
| binary | 011 | 001 | 11001 | 00101 | 0100 | 10 | 0001 | 10 | 101 |
| decoded | mech. | list set 1 | animal | mammal | carnivore | felidae | panthera | leo | - |

*Fig. 8t*

| cat | CLA | MTD | CAT | class | order | family | genus | species | T0 |
|---|---|---|---|---|---|---|---|---|---|
| # of bits | 3 | 3 | 5 | 5 | 4 | 3 | 4 | 2 | 3 |
| value | 3 | 1 | 25 | 5 | 4 | 2 | 2 | 1 | 5 |
| binary | 011 | 001 | 11001 | 00101 | 0100 | 10 | 0010 | 01 | 101 |
| decoded | mech. | list set 1 | animal | mammal | carniv | felidae | felis | cattus | - |

*Fig. 8u*

| Euro. red fox | CLA | MTD | CAT | class | order | family | genus | species | T0 |
|---|---|---|---|---|---|---|---|---|---|
| # of bits | 3 | 3 | 5 | 5 | 4 | 3 | 3 | 3 | 3 |
| value | 3 | 1 | 25 | 5 | 4 | 3 | 3 | 1 | 3 |
| binary | 011 | 001 | 11001 | 00101 | 0100 | 11 | 011 | 001 | 101 |
| decoded | mech. | list set 1 | animal | mammal | carnivore | canidae | vulpes | vulpes | - |

*Fig. 8v*

| Amer. red fox | CLA | MTD | CAT | class | order | family | genus | species | T0 |
|---|---|---|---|---|---|---|---|---|---|
| value | 3 | 1 | 25 | 5 | 4 | 3 | 2 | 2 | 3 |
| decoded | mech. | list set 1 | animal | mammal | carnivore | canidae | vulpes | fulva | - |
| # of bits | 3 | 3 | 5 | 5 | 4 | 3 | 3 | 3 | 3 |
| binary | 011 | 001 | 11001 | 00101 | 0100 | 11 | 011 | 011 | 101 |

*Fig. 8w*

Database storage for "leopard" is moved into EAX =>

| EAX | leopard | 01100111001001010100100001011*101* |

Database storage for "cat" is moved into EBX=>

| EBX | cat | 01100111001001010100100010011*101* |

The EAX and EBX registers are operated on:
XOR EAX, EBX yields =>

| EAX | - - - | 00000000000000000000000001111000 | which decodes as integer value 120

Similarly
Database storage for "leopard" is moved into register ECX =>

| ECX | leopard | 01100111001001010100100001011*101* |

Database storage for "dog" is moved into register EDX =>

| EDX | dog | 01100111001001010100110010001*11* | and the ECX and EDX registers are operated on:
XOR ECX, EDX yields =>

| ECX | - - - | 00000000000000000000001001110010 | which decodes as integer value 626

*Fig. 9b*

Database storage for "house cat" is moved into the EAX register =>

| register | word | CLA | MTD | CAT | SCO | NEG | CXT | AUX1 | AUX2 |
|---|---|---|---|---|---|---|---|---|---|
| EAX | house cat | 5 | 0 | 0Ah | 0 | 0 | 1Ch | 39h | 29h |

Database storage for "leopard" is moved into the EBX register =>

| register | word | CLA | MTD | CAT | SCO | NEG | CXT | AUX1 | AUX2 |
|---|---|---|---|---|---|---|---|---|---|
| EBX | leopard (Panthera leo) | 5 | 0 | 0Ah | 0 | 0 | 1Ch | 37h | 29h |

These two registers are operated on:
XOR EAX, EBX yields =>

| register | word | CLA | MTD | CAT | SCO | NEG | CXT | AUX1 | AUX2 |
|---|---|---|---|---|---|---|---|---|---|
| EAX | house cat XOR leopard | 0 | 0 | 00h | 0 | 0 | 00h | 0Eh | 00h |

Database storage for "dog" is moved into the ECX register =>

| register | Word | CLA | MTD | CAT | SCO | NEG | CXT | AUX1 | AUX2 |
|---|---|---|---|---|---|---|---|---|---|
| ECX | Dog | 5 | 0 | 0Ah | 0 | 0 | 1Ch | 39h | 29h |

The EAX and ECX registers are operated on:
XOR EAX, ECX yields =>

| register | word | CLA | MTD | CAT | SCO | NEG | CXT | AUX1 | AUX2 |
|---|---|---|---|---|---|---|---|---|---|
| EAX | wolf | 5 | 0 | 0Ah | 0 | 0 | 1Ch | 37h | 29h |

*Fig. 9c*

METHODS AND APPARATUS FOR UNDERSTANDING MACHINE VOCABULARY

RELATED APPLICATIONS

This Application claims the benefit under 35 U.S.C. §119(e) of U.S. Provisional Application No. 60/648,154, filed Jan. 28, 2005, entitled "METHODS AND APPARATUS FOR UNDERSTANDING MACHINE VOCABULARY", incorporated herein by reference in entirety.

BACKGROUND

Since the advent of electronic information processing, language translation has intrigued developers. Translation between human spoken languages, or so-called "natural" languages (e.g. English, Japanese, German, French, Spanish, etc) has traditionally been performed by a human translation agent conversant in both languages. Automation of the translation operation has been sought after for decades. One reason for difficulty in automating the translation is due to multiple meanings, or definitions for many words. Further, words often do not have an exact corresponding term in another language. Therefore, development of programmed logic for deterministically identifying a translated term in another language has been problematic.

In a natural language, words often have multiple meanings, or definitions. The particular meaning is often determined by other words used in conjunction with a particular word. Therefore, when identifying the meaning of a particular word, a human reader typically considers other words with which it is used. The collection of words in a sequence, such as a sentence or paragraph, defines a context in which the words are used. The context lends an intuitive setting to the words which make particular definitions more likely and other definitions unlikely or nonsensical. The particular intended definition of a word is therefore determined by the context of the words. Stated another way, the meaning of a word may vary with the other words around it. Often, only a particular definition of a word makes sense in a particular context, e.g. eating desert, or traveling across a desert. However, it can be both difficult and tedious to identify a deterministic rule or mechanism to compute a definition of a particular word based on the context implied by the other words with which it is used. Technologies identified by labels such as artificial intelligence and neural nets have purported to simulate the human cognitive recognition of words in context. However, accurate machine recognition of natural languages still fails to attain widespread development and usage. An intangible human component is often employed to identify the proper meaning of a word in a particular context.

SUMMARY

In a computer or managed information environment, programmed instructions for understanding words presents a complex problem. Some words represent things we can envision or relate to in some concrete manner. Other words represent things that are unfamiliar or abstract. Words for things with which we have no immediate experience can be explained in terms of other words with which we do. Even where we know the meaning of words, however, it is sometimes useful to abstract them and think not in terms of experience but rather their relationships to other words; and this is at the foundation of set theory and formal logic.

In these respects, numbers are much like words. Each of us has a real, experiential understanding of the numbers 1 and 2. The number pi is certainly within the grasp of most. But when we start dealing with numbers representing the national debt, many start to lose the ability to comprehend. And when we are dealing with numbers commonly encountered by astronomers and particle physicists, the minds of nearly all are boggled. We deal with this by abstracting the problem. The abstractions are subject to the laws of mathematics, are operable, and can be understood in those terms.

Computers are said to understand only numbers natively. This is not true in an unqualified sense. Computers can operate on numbers natively, but that is not the same as understanding. The computer that has an onboard floating-point unit can tell in a clock cycle that 1 is smaller than 2, but given the floating-point representations of these numbers, it has no idea that they indicate singularity or duality. It can convert these numbers to integer values, but there is still no understanding, not even of simple singularity or duality, unless what we mean by understanding is a native ability to operate on the numbers in ways that show how they relate to one another. It understands that $1<2$, that $1+1=2$, that $2-1=4-3$. This is understanding to a computer.

If the computer can be said to understand the relationships among concepts, words (or their definitions), well enough to be able to see set relationships, including superset, identity set, subsets, set unions, and so on, then clearly we are well on the way to having the computer understand concepts. If in addition, it can say that one thing is similar to another in some specific manner, which it can record and transfer to a third concept to produce a fourth, saying in effect, "as A is to B, so is C to D," and if it can do this as quickly as it can do "$2-1=4-3$," then it has an understanding of concepts that has a power similar to what it has with numbers. At such a point, we can certainly speak of computers understanding concepts with the same level of meaning that we use when we speak of computers understanding numbers.

Conventional language devices purport to implement a computer, or machine based, natural language recognition. Conventional natural language recognition mechanisms, such as language translation devices, purport to identify and recognize words used as part of a natural language sentence or paragraph. However, conventional language devices suffer from the shortcoming that they are typically unable to identify and distinguish from among multiple definitions of a word. For example, electronic translation dictionaries perform only a mapping from a set or words in one language to a roughly equivalent word in another language, and may provide multiple definitions of a word. Other computer based applications attempt to translate whole sentences, but may not accurately identify a proper definition of a word having multiple definitions. For example, the popular web browser Google® suggests a translation feature for web pages, however may not be able to distinguish, or disambiguate, the proper usage and hence, proper translated term of words having multiple definitions, or meanings.

Accordingly, configuration of the invention defined herein are based, in part, on the observation that conventional computer based language recognition mechanisms are unable to identify a particular meaning from among multiple potential meanings in a context of a sentence or paragraph. Such intended meanings are derived from the context of the sentence or paragraph based on the other words around which it is used. The context defined by the collective set of words in the sentence or paragraph identifies and disambiguates which definition from among multiple definitions is the proper definition in the particular context.

Configurations discussed herein substantially overcome the above described shortcomings of conventional natural language identification and translation by providing a language recognition mechanism operable to define a machine vocabulary and identify a machine language version of the words that preserves context and identifies the proper definition of the words by identifying and preserving context of a particular set of words, such as a sentence or paragraph. The machine vocabulary includes a definition section for each definition of a word. Each definition section includes a set of one or more definition elements. The definition elements include a predetermined format of definition fields, and each has a corresponding mask indicative of significant definition fields. The set of definition elements corresponding to a particular definition describe the usage of the word in a context matching that particular definition. Each definition element captures a characteristic of the definition according to fuzzy logic such that each of the definition elements collectively captures the context. The definition fields have values derived from sets of predetermined word lists that specify values for each definition of each word in a given natural language. The values in the word lists when populated in the definition elements of the words define a numeric representation, or bit structure, that can be employed in computations with other definition elements to identify similar contexts in which words are used. By performing such operations, such as XOR (Exclusive OR) and AND (Logical AND) on the definition elements, similarities between the words may be identified. These similarities result in values corresponding to the definition fields which map back to the word lists to identify the context of a particular word, and thus identify the proper definition in that context. The context of a sentence is therefore determinable by the definition elements of the words in the sentence, and the definition elements corresponding to the proper definition are computed. Once computed, the definition elements may be mapped back to the natural language dictionary of terms in the particular natural language sought (not necessarily the natural language of the initial sentence). In this manner, the machine vocabulary enables machine (i.e. software) driven processing of language for various applications, such as translations, recognition of equivalent or similar terms (i.e. thesaurus), and knowledge base interpretation, to name several.

In further detail, the method for representing text in a language independent numerical format according to configurations herein includes referencing a word from a set of words into a dictionary of numerical representations of words to find a corresponding dictionary term, and mapping the referenced dictionary term to at least one definition element indicative of usage of the word in at least one context. Various processing (i.e. software) may then compare the mapped definition element to the definition elements of other words in the set of words, in which the comparison is operative to identify similar contexts between the definition elements, identify, from the comparing, a definition element corresponding to the usage of the word in a context of the set of words.

Typically, the set of words is in series, such as a natural language sentence, and referencing includes parsing each word from the series of words. Processing includes comparing the parsed words to the dictionary, in which the dictionary is indicative of definitions of the parsed words, such that each word has one or more definitions. The definitions correspond to different contexts of the parsed words, identifiable via processing from the other parsed words in the sentence. A disambiguator process disambiguates the parsed words by analyzing each of the definition elements of the parsed words with the definition elements of the other parsed words, such that the analysis operable to determine a particular definition for each of the parsed words in a context of the series of words.

In the exemplary configuration, disambiguating further includes performing operations on at least a subset of the definition elements with at least a subset of other definition elements in the word sequence, in which each of the definition elements is indicative of a particular context, such that the operations are operable to identify particular definition element based on the context in the word sequence. Performing such operations includes performing bitwise operations on the definition elements, in which the definition elements have fields operable by the bitwise operations, and in which the operations further include selectively masking particular fields and result in identifying dissimilar bits between definition elements. Performing the operations may further include performing bitwise operations on the definition elements, in which the definition elements including bits ranging from most significant to least significant, and the definition elements have fields operable by the bitwise operations, wherein the operations result in identifying dissimilar bits between definition elements.

In the exemplary arrangement, each definition element has a defined a mask selectively indicative of an applicable subset of bits of the definition element for a particular definition of the word. The processing operations include the defined mask in the operation of the corresponding definition element, such that the mask is operable to indicate applicable bits of the definition element for the particular definition context.

Processing a text body of language elements, in an exemplary configuration discussed herein, may include receiving a series of words in a natural language, and parsing the series of words to derive an ordered set of words in the natural language. The processing method maps each of the parsed words to a corresponding term in a dictionary of numerical representations of words in the particular natural language, thus mapping each of the identified dictionary terms to at least one definition element, in which the definition elements are indicative of the word in context with other words, processing the mapped definition elements with other mapped definition elements from the ordered set of words to identify corresponding contexts of words in the ordered set of words, and identifying, from the processing, a particular definition element for each of the words applicable to the word in the ordered set of words.

For a particular word, the definition element may further include a plurality of definition elements, in which each of the definition elements corresponding to a mask indicative of significant fields in the definition elements, and further include a primary definition element indicative of a deterministic usage of the word, and one or more secondary definition element indicative of particular contextual usages of the word applicable to the primary definition.

The natural language processing disclosed herein included building a machine vocabulary, and employs a method for generating a machine vocabulary of numerical representations of words by classifying words as numerical language elements including defining a plurality of tables, each of the tables having a set of words indicative of a particular context, and populating one or more definition element corresponding to a word, in which the definition elements have a plurality of fields, in which each of the fields having a value corresponding to the defined tables. Populating further includes identifying, for each field, a corresponding table from the plurality of tables, and determining, for the identified field, an entry from the table corresponding to a definition of the word in a particular context. The population further includes storing an index of the entry from the table in the identified field, and selectively repeating the population of definition elements according to the rules to substantially define the word in the context of a particular definition. In the exemplary configuration, determining the entries includes computing an applicable classification rule from a set of classification rules, and determining a value for the identified field based on the rule.

A natural language dictionary corresponds to the plurality of definitions, such that each definition is indicative of a particular context of the word. Building the dictionary and the corresponding definition elements includes repeating the population of definition elements for each definition of the word, in which each definition is indicative of a particular context of the word. The classifying may include referencing the plurality of tables by numerical indicators from dictionaries in a plurality of natural languages.

In the exemplary arrangement herein, populating further includes subdividing the plurality of fields in the definition element into a header portion and a subject portion, in which the header portion matches the header portion of other definition elements operable for comparison, and the subject portion is operable to indicate contextual differences between the definition elements. The header portion further contains a plurality of attributes, including a class attribute indicative of a general usage of a particular word and a first subset of the set of tables used to define the word, a method attribute indicative of the manner of definition of the word in the definition elements and a second subset of tables operable to define the word, a category attribute indicating a specific applicability of the word for a particular definition, and a scope attribute indicative of a further subset of the second set of tables applicable to a particular definition of the word, discussed further in the description that follows.

An exemplary usage of configurations herein include universal translation independent of a native natural language, including generating a numerical language representation by classifying language elements according to a predetermined set of rules, the numerical language representation having a plurality of numerical definition elements corresponding to words in a particular usage context. The translation further involves receiving a natural language sentence in a first natural language, the natural language sentence comprising a series of words, and computing a series of definition elements corresponding to each of the words in the first natural language sentence, in which the definition elements are indicative of each of the words in the context of the received natural language sentence. The translation processing determines, from the computed series of definition elements, a second set of language elements in a second natural language, the definition elements selected in a manner that preserves context from the first natural language sentence. Translation includes processing according to disambiguation logic, the disambiguation logic operable to perform logical operations on the elements to identify a context appropriate to each of the words.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 5a-5h are diagrams of word lists employed for classifying and generating the definition elements of FIGS. 4a-4c in the machine vocabulary;

FIGS. 6a-6b show generation of definition elements populated with the values in the word list tables in FIGS. 5a-5f via the method of FIGS. 4a-4c.

FIGS. 8a-8d shows definition elements generated by the process depicted in the flowcharts of FIGS. 4a-4c;

FIGS. 8e-8w are diagrams of definition elements generated by the process depicted in the flowcharts of FIGS. 7a-7c;

FIGS. 9a-9c are diagrams of bitwise operations using the definition elements from FIGS. 8a-8w;

DETAILED DESCRIPTION

Figure 1:
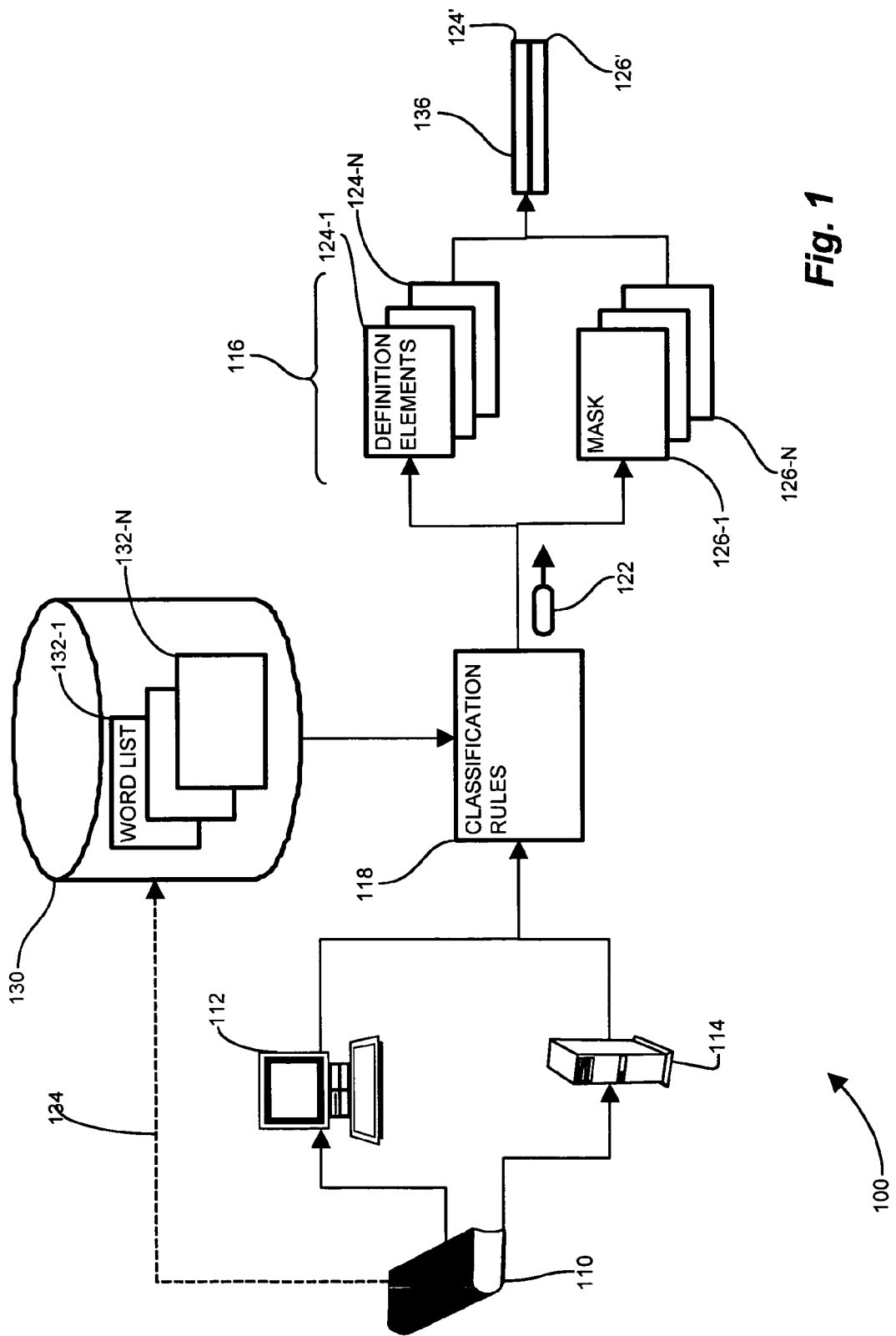
FIG. 1 is a context diagram of an exemplary development of definition elements from natural language word lists suitable for use with the present invention.

Configurations herein provide lists of words represented in a numerical format operable for computations with other words in a similar numerical format. An ordered list of words has its words in a particular order, which may be associated with numeric values. This may also be called an enumerated list. A titled list of words has words grouped under titles. A title has an associated numerical value that can be tested for by a logical operation. For example, if the titled list of 256 words is grouped with seven values to each title, then we can mask any value in the list by ANDing it with the binary value 11111000, and the result is the title of the group. Thus, if the hexadecimal value associated with the title "organism" is B0, and the value of "animal" is B3 we can AND animal with 11111000 to see that it belongs in the organism section. The relationships of words within the section are undefined. An untitled word list is a list of words without the titles of the titles list. It may or may not be grouped into sections, but the sections are without titles and have no meaning that can be simply derived from the list. Finally, a tree-defined word list is a list of words can also be defined as a list of words, each of which represents the title or first element of a list of words, each word of which may represent the title or first element of a list of words, and so on. In an exemplary configuration, the word lists include a root, or fits list such that the first list consists of eight words for the classes, each of which eight words is the title or first word in a list of four words for the subclasses, and each of these, in turn, is the title or first word in a list of eight categories. These words are represented by eight bits. The most significant three of these indicate the class, the next two indicate the subclass, and the least significant three or which indicate the category, collectively defining an 8 bit foundation (FND) field. From this structure, it is apparent that the word lists employed for robustly classifying a particular natural language are substantial in number. Therefore, only a subset of the word lists are reproduced herein.

The value in FND is defined in the top level Rootlist, which has 256 values. For scopes 0 and 2, all other fields are populated by words from tables, one table for each field of each scope of each class (scopes 0), or one table for each field of each scope of each category (scope 2). Scope 1 uses a different scheme, and scope 3 is only very vaguely defined.

The definition elements are employed in several taxonomies. A simple taxonomy is one in which all information relates to a single tree-defined structure.

A multiple taxonomy considers membership of a word in several different simple taxonomies simultaneously. For example, we could have separate taxonomies each answering a different question about the object, such as: (1) what is its essential nature (what is the primary meaning word in a dictionary), (2) what is the context within which it exists, (3) where did it come from, (4) how does it operate, and (5) what is its purpose? Such a taxonomy can be have multiple values within a single datum, in which case it is considered to be internally multiple and may be called a multiple primary taxonomy, or can use multiple data, in which case it is externally multiple, and may be called a simple secondary taxonomy (see "definition element," below). A compound taxonomy considers membership of a word in different taxonomies, both simple and multiple.

Therefore, definition element referred to above, in the exemplary configuration, is a 32-bit value used in conjunction with technology 2 (current technology). It may be primary, meaning that it is sufficient to identify the word uniquely by itself, or secondary, meaning that it does not completely separate it from other words of similar meaning. A genus/species definition of an animal is primary where the species is being defined, but not for breeds or sub-species. A single definition element is probably not sufficient to finish a definition even if it is primary, because disambiguating is not enough for the purpose of using and understanding the definition. For example, if we can distinguish *canis familiaris* as the species of the dog, it still does not tell use enough to really define the word dog. For that purpose, we also include the information that the dog is a carnivore, has paws, may be a pet, can help us hunt, guard our possessions, or find our way, and so on. So, many definition elements may be combined to finish a definition. The definition elements include the following fields, the significance of which will become apparent in the discussion that follows. An exemplary field structure is also discussed further below, however the format of the definition elements and field sizes therein may be different in alternate configurations. Generally each occupies a predetermined number of bits in a particular word size, such as 32 bits.

The Class of a word is its most significant field (represented by three bits)—referred to as the CLA field.

The Method or MTD field contains an integer value for Tech 2. While different sizes of integers might be used, for now we are anticipating using two bits and using values ranging from 0 to 3. This value tells us how the remainder of the element is defined, operating in a manner similar to the field controlling variation of a variable record. Its least significant bit also functions as the least significant bit of LST. Alternate configurations may employ the use of a MTD field of 3 bits.

The Category of a word is its third most significant field and second most significant word field in Tech 2. It is referred to as the CAT field. It is present in most 32-bit definition elements.

The FDN or Foundation field in Tech 2 is the combination of the CLA and CAT fields. It can be regarded as a single field which is divided between two places in the definition, or as the combination of two separate fields. It is computed by multiplying CLA by 16 and adding CAT, also shown below as a hexadecimal computation mapping values from the word lists.

A Scope field, or SCO of one or two bits, represents which of various alternative word list is in use for a given element, together with the scope within which the list is used. Thus, for MTD=0 or MTD=2, for each of scope 0 and scope 1, there may be a different set of lists for CXT, AUX1, and AUX2 that are general to the CLA/MTD value, and scope 2 may have a different set of lists for each FND/MTD value. Scope 3, then, may have a different set of lists for AUX1 and AUX2 for each CXT value of each FND/MTD. For MTD=1, the SCO values may simply represent the part of the numerical value that is represented, SCO=0 for the most significant 19 bits, SCO-1 for the next, and so on.

The Negation field or NEG is a single bit that negates a word.

The Context field, or CXT provides a context for the FND value. It is 6-bits and has 64 values which may be ordered in various ways, usage determined by a mask.

AUX1 and AUX2 are auxiliary fields whose values modify the meaning of FND/CXT. They are 6-bit, with 64 values that may be ordered in various ways as determined by a mask.

The VAL or Value field is used in set 0 definitions, and occupies part or all of the places occupied by NEG, CXT, AUX1, and AUX2 of method 0 definitions. Thus it may be any size up to 19 bits.

The T0 field is the consists of undefined bits in the MTD set 1 definitions. These bits are in what would normally be considered the least significant bits of integer representation. They do not have or contribute to meaning, and are placeholders only.

The mask is a 32-bit value accompanying each element. It relates to the element in a bit-by-bit manner, each bit of the mask being a 1 if the relative bit of the mask is significant, or a 0 if it is not. For word lists that are titled lists, the zeroed lower bits of the titles mask out the bits of all values covered by the title. In tree based lists, the lower bits of the nodes are masked out. This means that items within the list all match, when compared through the mask, to the title. A zero value in a field is normally masked out in all list situations, which means that a zero value, which represents "no value given," matches to anything.

One particular goal of the configurations herein is to be able to represent words in a bitwise manner that can be stored into a computer register (typically 32 bits) and is operable to produce, at the very least, comparative analogies (e.g., as X is to Y, so is A to B). Analogies are useful as a test that do not have the pitfalls in a Touring Test. Embodiments disclosed herein are based on an observation that, while succeeding in meeting the Lumbreyer criterion (i.e., that by being able to operate on analogies, a computer proves its artificial intelligence) by use of a properly defined variable storage format would not indicate the achievement of artificial intelligence, it would certainly be an indicator of a system that displayed a sophisticated understanding of how concepts relate to each other and have great utility.

FIG. 1 is a context diagram of an exemplary development of definition elements from natural language word lists suitable for use with the present invention. Referring to FIG. 1, a natural language dictionary 110 is the basis for creating a corresponding machine vocabulary 116. Other natural language dictionaries 110' (FIG. 3, below) enable translation between languages by employing natural language terms from the dictionary 110' based on the machine vocabulary, discussed further below. A classifier 128 generates the machine vocabulary 116 according to classification rules 118 using a term entry workstation 112. The classification rules 118 identify, for each definition of a dictionary term 120, values for the definition elements 124-1 . . . 124-N (124 generally). In alternate configurations, a classification server 114 may automate the application of classification rules 118 to the dictionary terms 120.

The classification rules 118 specify, for a particular definition of a dictionary term 120, values for the field within the definition elements (definition fields, discussed further below). The classification rules employ a plurality of wordlists 132-1 . . . 132-N (132 generally), stored in a classification database 130. The wordlists identify values for each of the fields in the definition elements to be populated as specified by the classification rules. Accordingly, the word lists 132 are derived from the natural language dictionary 110, as shown by arrow 134, and may be developed for other natural language dictionaries 110' to enable translation, discussed further below.

Accordingly, application of the classification rules 118 and the word lists 132 yields a definition element 122 corresponding to the classified term 120. As indicated above, each definition of a term 120 includes one or more definition elements 124 defining a definition category, and each term 120 has a definition category for each definition of the word 120 based on the natural language dictionary 110.

Each of the definition elements 124 has a corresponding mask 126. The mask is a set of bits paralleling the bits in the definition element (typically 32). The mask denotes the definition fields, or subfields, within the definition element that are applicable. Thus, particular definition fields in the definition elements 124 are nulled, or cancelled, by the bit mask 126. The aggregate set of definition elements 124 and corresponding masks 126 thus form the machine vocabulary 116. The definition element 124 and corresponding mask 126 collectively form a definition element pair 136, including a definition element 124' and the corresponding mask 126.' Definition element pairs including a definition element and a corresponding mask (definition elements 124 as used herein may be assumed to have the corresponding mask).

Figure 2:
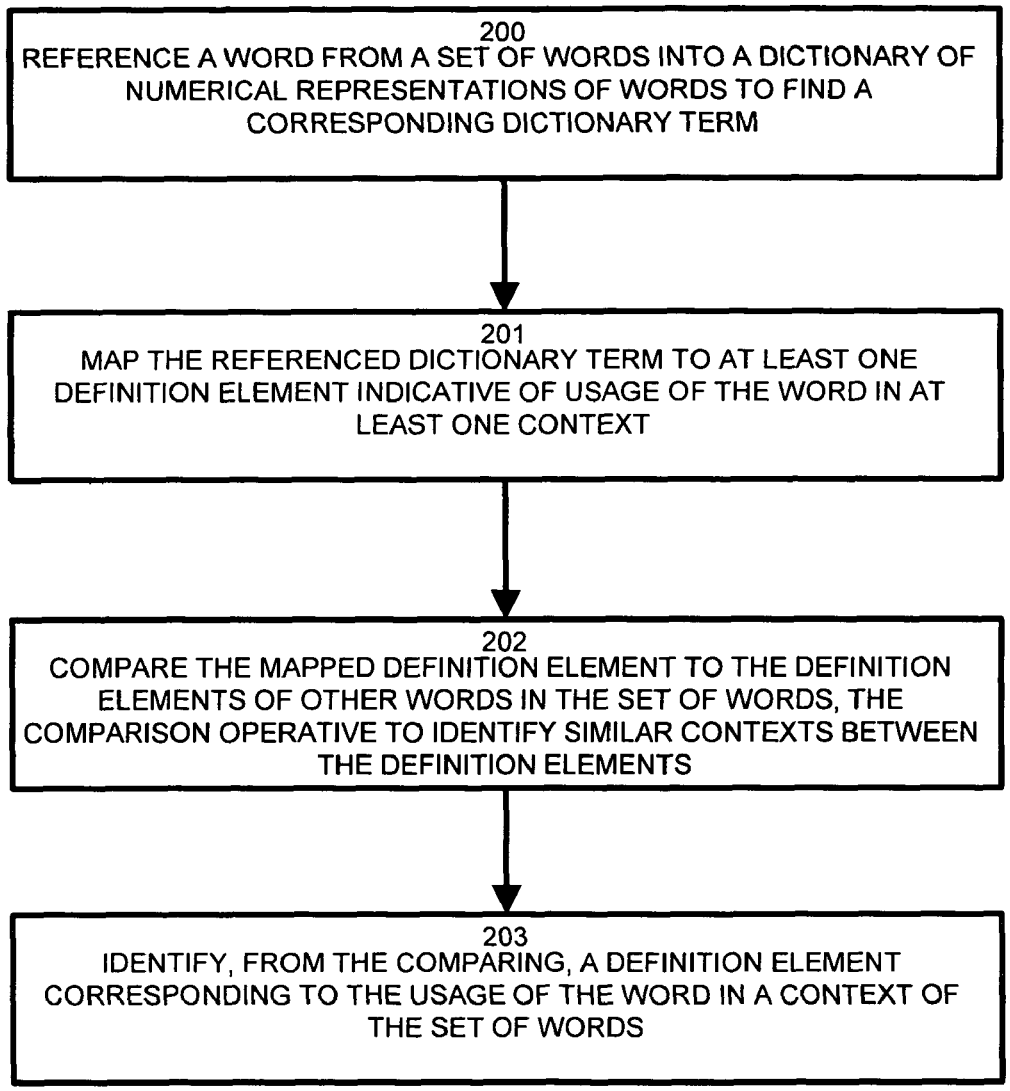
FIG. 2 is a flowchart of usage of the machine vocabulary of definition elements.

FIG. 2 is a flowchart of usage of the machine vocabulary of definition elements in the environment depicted in FIG. 1. Referring to FIGS. 1 and 2, the method for representing text in a language independent numerical format includes referencing a word from a set of words into a dictionary 116 of numerical representations of words to find a corresponding dictionary term, as depicted at step 200, and mapping the referenced dictionary term to at least one definition element indicative of usage of the word in at least one context, as shown at step 201. At step 202, a language processor such as the machine vocabulary processor (FIG. 2, 160), discussed further below, then compares the mapped definition element to the definition elements of other words in the set of words, the comparison operative to identify similar contexts between the definition elements. At step 203, the machine vocabulary processor 160 identifies, from the comparing, a definition element corresponding to the usage of the word in a context of the set of words.

The exemplary configuration discussed below shows computations and manipulations using the definition elements as words in a machine vocabulary to process a set of words (i.e. a sentence) and derive an understandable result in the form of other definition elements, representing output such as a translation, analogous sentence, opposite sentence, or other recognition of intra word relationships from programmed logic. From a mathematical point of view, the problem with a taxonomy to which all things belong is that it provides only one avenue for relationships. We can see that a leopard (FIG. 9b) is very like a housecat (FIG. 9b) in the scientific naming taxonomy for species. That taxonomy does not aid us in determining that it the housecat is very like a dog because both are pets.

Figures 8A, 8B:
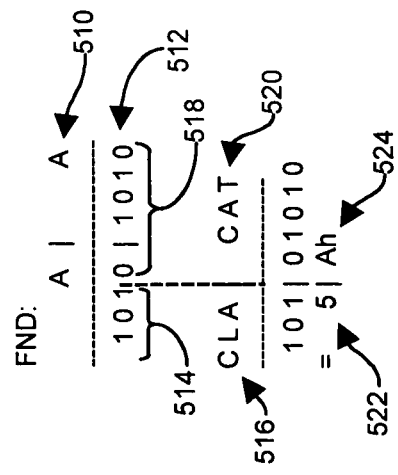

Referring briefly now ahead to FIGS. 8e-8g respectively, definition elements for a feline, house cat and lynx are shown. An exemplary solution to this problem is to provide a multiple taxonomy, either within the structure of the data element), so that each datum is internally multiple, or by multiple use of a simple taxonomy, so each definition consists of externally multiple data elements. In the former case, a datum contains fuzzy data: housecat is defined as "land animal that eats animals, has a retractable claw, and is a pet," and lion 500 (FIG. 8a) as "land animal that eats animals, has a retractable claw, and is wild and dangerous." The former definition sufficiently defines housecat uniquely, the later does not disambiguate lion from tiger, leopard, etc. Each, however, provides a definition of the animal in five terms: (1) animal, (2) where it lives, (3) what it eats, (4) a bit about its physiology (for example the type of foot), and (5) how it relates to human beings.

Particular features may be seen in the tables. The mask (not specifically shown in the tables) masks out all zero fields for all entries, as described above. This means that the AUX 1 values of the method 0, scope 0 values of house cat, 39h, lynx, 34h, and leopard, 37h, all match to the 0 given in the definition of feline. If we defined "wild cat." the value in AUX1 would be a 34h, as it is for lynx, meaning "wild". This value would have its lower two bits masked, so it would be a match for either lynx or leopard. The lower bits of lynx, however, might be left unmasked, meaning that the lynx is wild, but not defined as dangerous.

The value of all felines says they have retractable claws. There are doubtless several genera of animals that would match the definition of cat if it did not have this element. In order to keep them separate, it would be necessary to provide a method 0, scope 1 element in their definitions if no other distinction is made. This is unnecessary for canines, because the method 0, scope 0 definition of canine says it does not have a claw, but a paw, and this is sufficient to make the method 0, scope 1 definition unnecessary.

In the later case, several data elements are needed, and each is precise do define an object in terms of its own structure, but usually several definitions are needed to provide machine understanding. Additionally, it should be understood that in such cases, a single object may appear in several places in the taxonomy. For example, "lion" might be in a taxonomy that moves from "land animal" to a branching with choices of "mammal, reptile, carnivorous, omnivorous, herbivorous, hoofed, having paw, having claw, having fin, agricultural, pet, and wild." Clearly, lion belongs on several of the branches, and therefore is represented multiple times. A complete definition in this case can be made by providing a data element for each branch.

Figure 3:
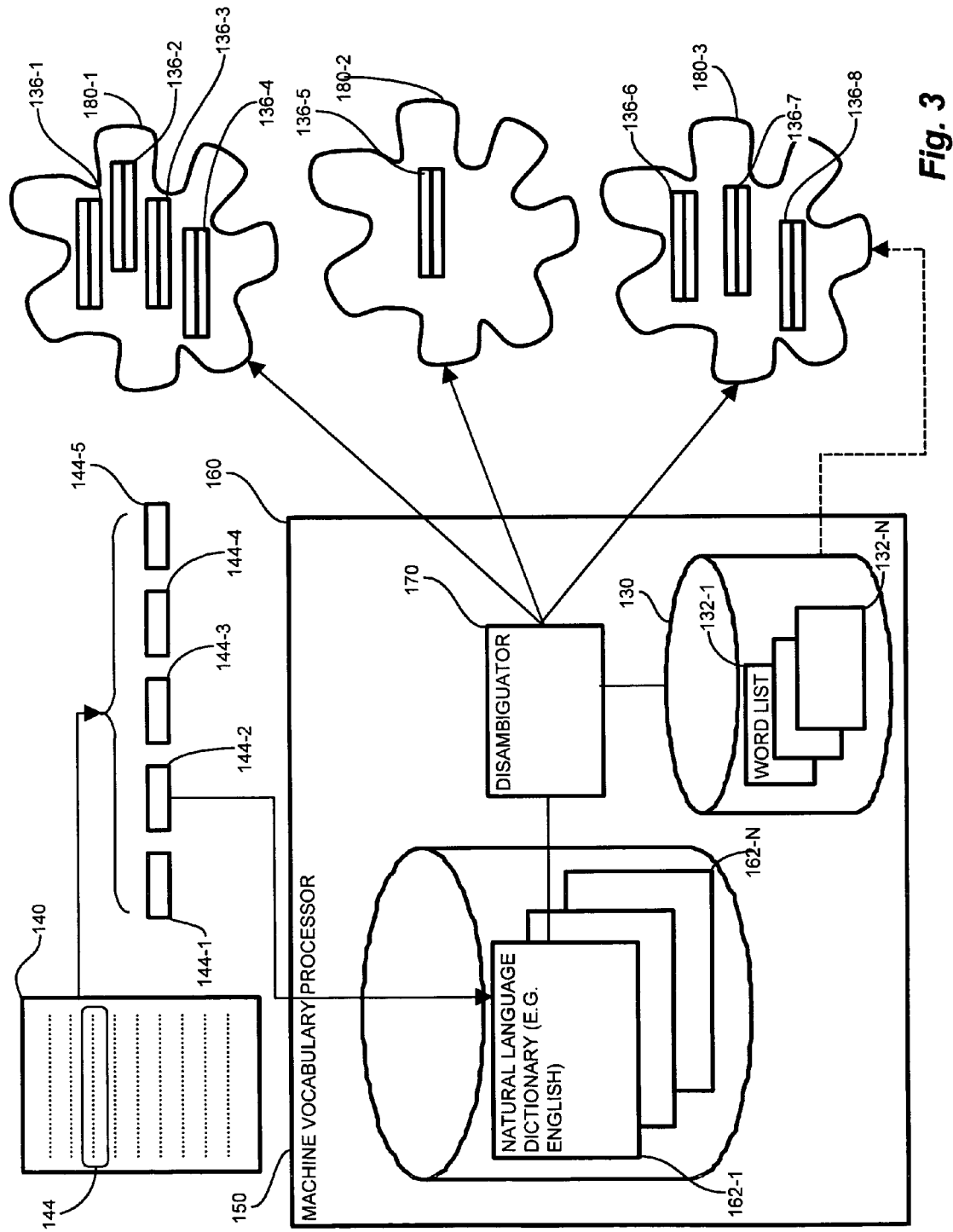
FIG. 3 is a block diagram of processing a natural language sentence into the corresponding machine vocabulary using the definition elements of FIG. 1.

FIG. 3 is a block diagram of processing a natural language sentence into the corresponding machine vocabulary using the definition elements 124 of FIG. 1. Referring to FIGS. 1 and 3, a machine vocabulary processor 150 includes or has access to the classification word lists 130 and a language repository 160 including one or more natural language dictionaries 162-1 . . . 162-N (162 generally). The natural language dictionaries 162 each include words in a particular natural language (i.e. English, Japanese, etc) mapped to the definition sections and definition elements (derived form the classification of FIG. 1) that define them in the machine vocabulary 116. The word lists 130 likewise include the natural language terms corresponding to the fields of the definition elements generated form the classifier 128 in FIG. 1.

The machine vocabulary processor 150 receives a language fragment 142, such as a sentence or paragraph, from a portion 144 of a text source 140, such as an email, digitized voice, book, document, or any suitable natural language source. The fragment 142 includes a set of words 144-1 . . . 144-5 (144 generally) that collectively define a context (i.e. a sentence). The machine vocabulary processor 150 maps each of the words 144 into the corresponding natural language dictionary 162 in the appropriate natural language. Each of the words 144 maps to at least one definition section 180 having at least one definition element pair 136. In the exemplary arrangement shown, word 144-2 maps to three definition sections 180-1, 180-2 and 180-3, having four, one and three definition element pairs 136, respectively (136-1 . . . 136-8) A disambiguator 170 computes, by processing the definition element pairs 136 of each of the words 144 in the fragment 142, the appropriate definition section 180 from the definition elements 136 most closely matching the definition elements corresponding to other words 144 in the fragment. Therefore, the definition sections 180 corresponding to each of the words 144 imply a context defined by the definition elements 136 corresponding to other definition elements 136, as computed by the disambiguator 170 and discussed further below.

For example, using the illustration above, the word "desert" may refer either to a food item or an arid location. If the definition elements 136 from the other words 142 in a sentence (fragment 142) pertain to food, then the definition element of desert as a food item would bear a correspondence to these definition elements. If the words pertain to location, then the definition elements of the other words would correspond to location, and the definition of desert (i.e. the definition elements 136) as a location would bear a higher correspondence to the other words 142.

The processing performed by the disambiguator includes bitwise operations such as exclusive ORs (XORs) between the definition elements 124, and logical ANDs (ANDs) with the masks of the corresponding definition elements. Other operations may be performed as well. The values in the fields of the definition elements, derived from the word lists, causes similar values to be nulled out, and differences between definition elements to be compared to the word lists to identify the nature and/or magnitude of the difference. Since the definition element fields are arranged from most significant to least significant, an XOR operation tends to yield lower values for similar definition elements. A variety of alternate processing logic will be apparent from the examples below.

Figure 4A:
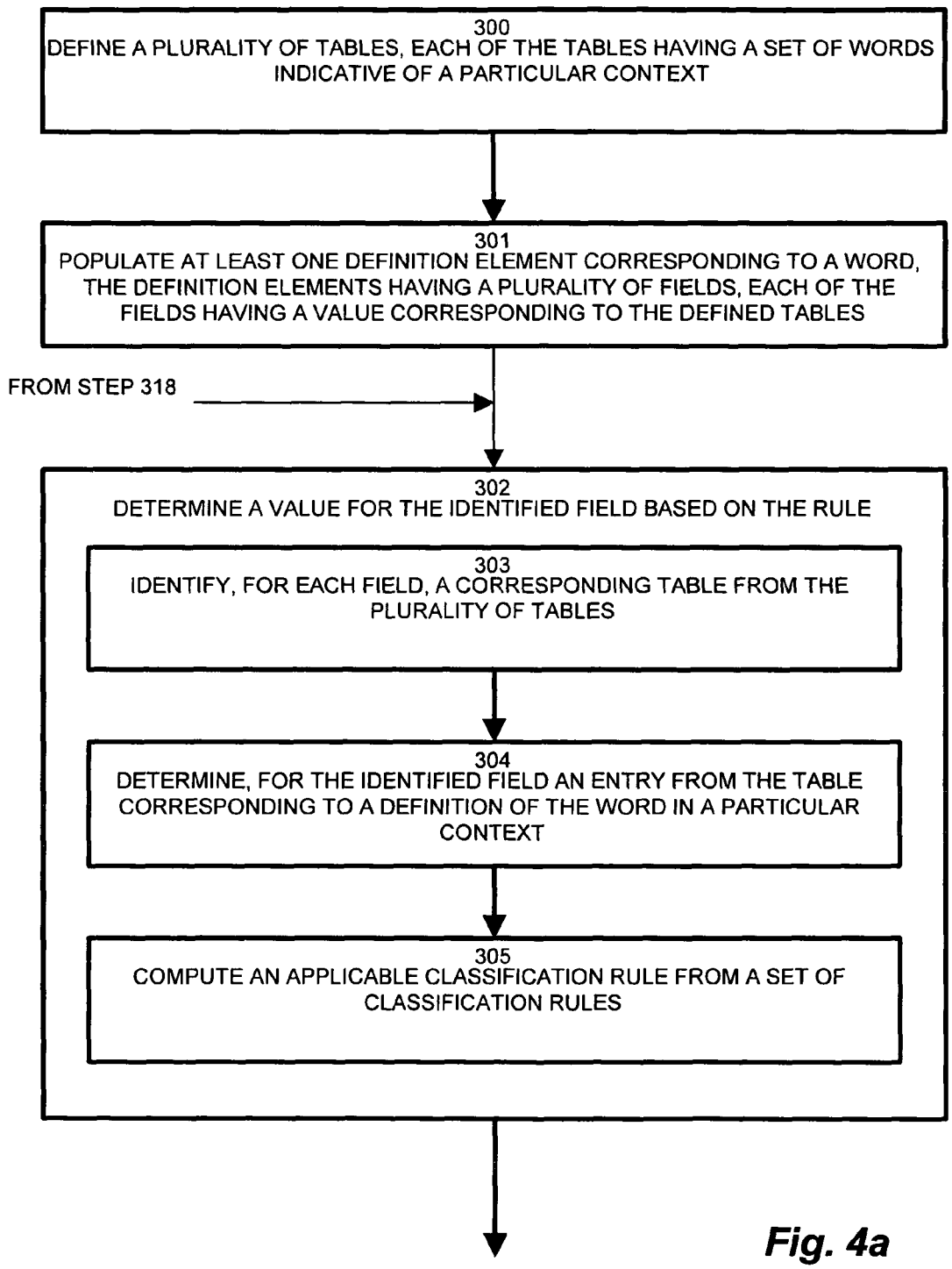
FIGS. 4a-4c are a flowchart of generation of definition elements.

FIGS. 4a-4n are a flowchart showing generation of definition elements 124. The generated definition elements comprise the machine vocabulary 116. Referring to FIGS. 1, 3 and 4a-4c, the method for generating a machine vocabulary of numerical representations of words by classifying words as numerical language elements further includes, at step 300, defining a plurality of tables (i.e. word lists 132), such that each of the tables has a set of words indicative of a particular context. As shown at step 301, the word lists 132 are for populating at least one definition element corresponding to a word, in which the definition elements 124 have a plurality of fields, and each of the fields having a value corresponding to the defined tables 132.

At step 302, the method computes an applicable classification rule from a set of classification rules 118. The classification rules specify, for each field in the definition element, determination of the applicable words from the word lists. The word lists contain the values, or indices, corresponding to each term they contain. This includes, at step 303, identifying, for each field, a corresponding table from the plurality of tables, and determining, for the identified field, an entry from the table corresponding to a definition of the word in a particular context, as depicted at step 304. For each context, or definition in which a word may be used, the method determines a value for the identified field based on the rule, as disclosed at step 305. The definition element 124 stores an index or value corresponding to the entry from the table in the identified field, as shown at step 306. Populating each definition element may include referencing the plurality of tables 132 by numerical indicators from dictionaries in a plurality of natural languages, or may all be taken from the same natural language (i.e. English). In other words, various natural language dictionaries 110 map to the definition elements 116 (i.e. machine vocabulary) to identify their meaning, such as by an ascii string of the word and an index to the definition element, or any other suitable mapping. The result is one or more definition elements in the machine vocabulary for each definition of a particular word.

Populating the definition elements may further include subdividing the plurality of fields in the definition element into a header portion and a subject portion, such that the header portion matches the header portion of other definition elements operable for comparison, and in which the subject portion is therefore operable to indicate contextual differences between the definition elements, as depicted at step 307. In the exemplary configuration, therefore, comparisons and operations, discussed further below, occur between definition elements having similar headers. The definition elements further include a foundation and context fields, such that the context field including a context attribute and at least one descriptor field indicative of the word in the context specified in the context attribute, wherein the foundation is operable for comparison with other words having a corresponding foundation field. As will be discussed further below, several arrangements, or formats, of definition elements occur. The method field is indicative of a particular format.

For particular method field values, the foundation field is an aggregation of the class and category fields.

In the exemplary configuration, defining the fields in the definition elements 124 further includes, for each definition element, defining a mask selectively indicative of an applicable subset of fields of the definition element for a particular definition of the word, as shown at step 309. In the exemplary configuration, where the definition elements define bit fields, a bit mask is operable to nullify, or "don't care" certain fields, and is readily achievable via a logical AND with the corresponding definition element. Accordingly, the definition element 124 and fields therein include a plurality of bits, and the mask is selectively indicative of bits within the field, in which each of the bits indicative of a particular contextual significance, as depicted at step 310.

As depicted at step 311, the header portion is typically subdivided into a plurality of attributes including a class attribute indicative of a general usage of a particular word and a first subset of the set of tables used to define the word, as depicted at step 312, a method attribute indicative of the manner of definition of the word in the definition elements and a second subset of tables operable to define the word, as shown at step 313, a category attribute indicating a specific applicability of the word for a particular definition, as disclosed at step 314 and a scope attribute indicative of a further subset of the second set of tables applicable to a particular definition of the word, as depicted at step 315.

The definition element generation continues selectively repeating the population of definition elements according to the rules to substantially define the word in the context of a particular definition, as depicted at step 316. The generated (classified) definition elements thus define a dictionary 116 of machine vocabulary which may be mapped from a plurality of natural language dictionaries. While an unabridged set is not mandatory, robustness is increased by the addition of definition elements 124. A check is performed to determine if more definitions exist for a particular natural language word, as depicted at step 317. If so, the process repeats the population of definition elements for each definition of the word, each definition indicative of a particular context of the word, as shown at step 318. The result of classifying the natural language words and terms is a natural language dictionary corresponding to a plurality of definitions (definition elements), each definition indicative of a particular context of the word, as depicted at step 319.

In the exemplary configuration discussed herein, multiple natural languages are applicable to the machine vocabulary, enabling operations such as translation from one language to another, discussed further below. Accordingly, it is beneficial to enumerate the word definitions for the purpose of cross-referencing natural language dictionaries. Therefore, each word, expressed as a string of letters, is associated with an index of a definition for each definition of the word, thereby mapping the natural language word in a particular natural language dictionary to the corresponding machine vocabulary definition, including a definition section of definition elements.

Given the fact that a substantial rules list is necessary, it is not necessary to have a single uniformly defined word list, but that each class of words might have its own list of words for each field other than the first, and, indeed, differing lists for each field.

Furthermore, since for most classes of words there were fewer than 32 values actually used in any given field, the fields could be generally compacted to five bits and use 32-word lists, though for certain classes, the lists could be larger or smaller for each field.

It follows that an integer of very limited size, two to four bits, may be used to indicate which of several sets of word lists would be used in the definition of any given word, providing four to sixteen sets of lists for each class of words, and the lists need not be uniform in size or meaning for words having differing values in either the CLA or MTD fields.

Additionally, if the method number is inserted into the middle of the foundation value, separating the foundation field into its class bits, which are followed by the method bits, and then by the category bits, then the most significant five or six bits of the word definition can provide an index into an array of descriptions of fields, the method of the words decomposition, and the types of operations the definition allows.

Having seen that this makes it possible to produce 32-bit definitions that are nearly as useful as 64-bit definitions, if follows that, in alternate configurations, a possibly variable number of definitions could be used for each word, each defining the word in terms of different lists and for a different purpose, each further enriching the information in the overall definition.

It is not necessary to have a CAT field for all CLA/MTD combinations. Tentatively, method 3 (Table 1) will provide definitions that use a word list of prepositions instead of the CAT field word lists. This will make it possible to include an index of 20 to 24 bits into the word definitions list, which will provide such meanings as "component of X", or "located in X" where X is the word indicated by the index.

The definition of a word can consist of as few 32-bit elements as 1. As a matter of discipline, we should have one and only one definition for a word that uses method 0. Among other things, this can make the presence of a method 0 definition an indicator that a new definition or section of a definition has begun All biological species should probably have a method 1 definition, and only one of these is possible of whatever number of scope values it requires. Thus a definition can have any number of 32-bit elements in it. This is, therefore, a compound taxonomy.

Configurations discussed herein based, in part, on an observation that there are certain commonalities shared by the various machine vocabulary representations disclosed above. At the crux of the matter is the fact that in each, a definition consists of statements as to the sets to which something belongs. This can be done by combining different elements expressed in terms of simple taxonomies, for example, defining a car as, "land vehicle," and "motor vehicle," and "passenger vehicle," and "mid-sized vehicle," providing four 32-bit simple elements. It can also be done by combining fuzzy set values into a single element, such as the 32-bit value that decodes as, "motorized passenger land vehicle." The former system provides a solution, which is bulky and slow, but can define almost anything. The later provides a solution, which is lean and fast but may not always be complete. The exemplary arrangement herein integrates these approaches.

FIGS. 5*a*-5*f* are diagrams of word lists employed for classifying and generating definition elements in the machine vocabulary. For the exemplary classification arrangement, the first field of the word, the CLA field, contains the most significant three bits of two different indices. The first of these has its least significant two bits in the MTD field and provides an index into an array of descriptors of list records. Each list record may contain values telling the number of the fields in the remainder of the word definition together with information as to their sizes and types; the types may be titled lists, untitled lists, ordered lists, tree-defined lists, bitfields, simple integers, integer pairs, other types of numerical values, and so on. Each list record always contains the meanings of the words in the list. FIGS. 5a and 5b show the root level word list including 256 values for populating the foundation field. The foundation field includes the class and category values for a definition element, discussed further below with respect to FIGS. 8a-8n for populating definition elements. FIGS. 5c-5f show particular word lists having values for context (CXT), AUX1 and AUX2 fields for particular values of foundation (from FIGS. 5a and 5b). These values are discussed below in defining definition elements for "lion" and "leopard" in FIGS. 6a and 6b, respectively.

The list record in the MTD field also tells what types of operations can be performed on the word definitions. As examples: (1) the words for numbers may contain numerical values subject to numerical computations. (2) the words for colors may contain bitfields that contain color mix information, which can be compared or

| MTD | # per definition | Taxonomy |
|---|---|---|
| 0 | 1 | Multiple primary |
| 1 | 0 or 1 | Simple primary |
| 2 | Any number | Multiple secondary, may be in statement form |
| 3 | Any number | prepositions with indices of words | computed by special operations for colors. (3) some word definitions will be subject to the same types of operations used for Tech 1. (4) simple taxonomical definitions will can be XORed to provide the location of the most significant bit that differs, providing an indicator of how closely two things are related (see diagrams 1 and 3). Other types may be identified in the future. Thus the method (MTD) field values are as shown in Table I:

Table I

Because the combination of the MTD field with the CLA field tells us how the definition is structured, we can XOR a pair of definitions, examine the result to see if any of the most significant bits is set (the actual number of bits depending on the SCO field), and, if none is, know that given operations on them will be valid. For that reason, the MTD field is regarded as more significant than the CAT field. Also, the operations vary with the types of fields used, as the following examples indicate.

The second index of which CLA provides the most significant bits is the index of the word lists used for each field. For this purpose, the number of additional bits may be provided by a descriptor in the list records described above. Those bits will be found in the CAT field. These words are not usually referenced, and in practice might not be available to most applications, but are nonetheless real and useful for building and evaluating definitions. The second complete index may identify not only the list of words as strings (which are not needed by all applications) but also indices of the words' definitions in the dictionary.

The scope numbers are ordered as a bitfield of two or three bits. The most significant bit tells whether the value indicated can stand alone (0), or is an extension of the previous stand-alone field in the definitions (1). If ordered as three bits, the second most significant bit tells whether the definition can have only one entry per definition (0), or several (1). The least significant bit tells whether the taxonomy represented in the definition element is multiple (0), or simple (1).

Figure 7A:
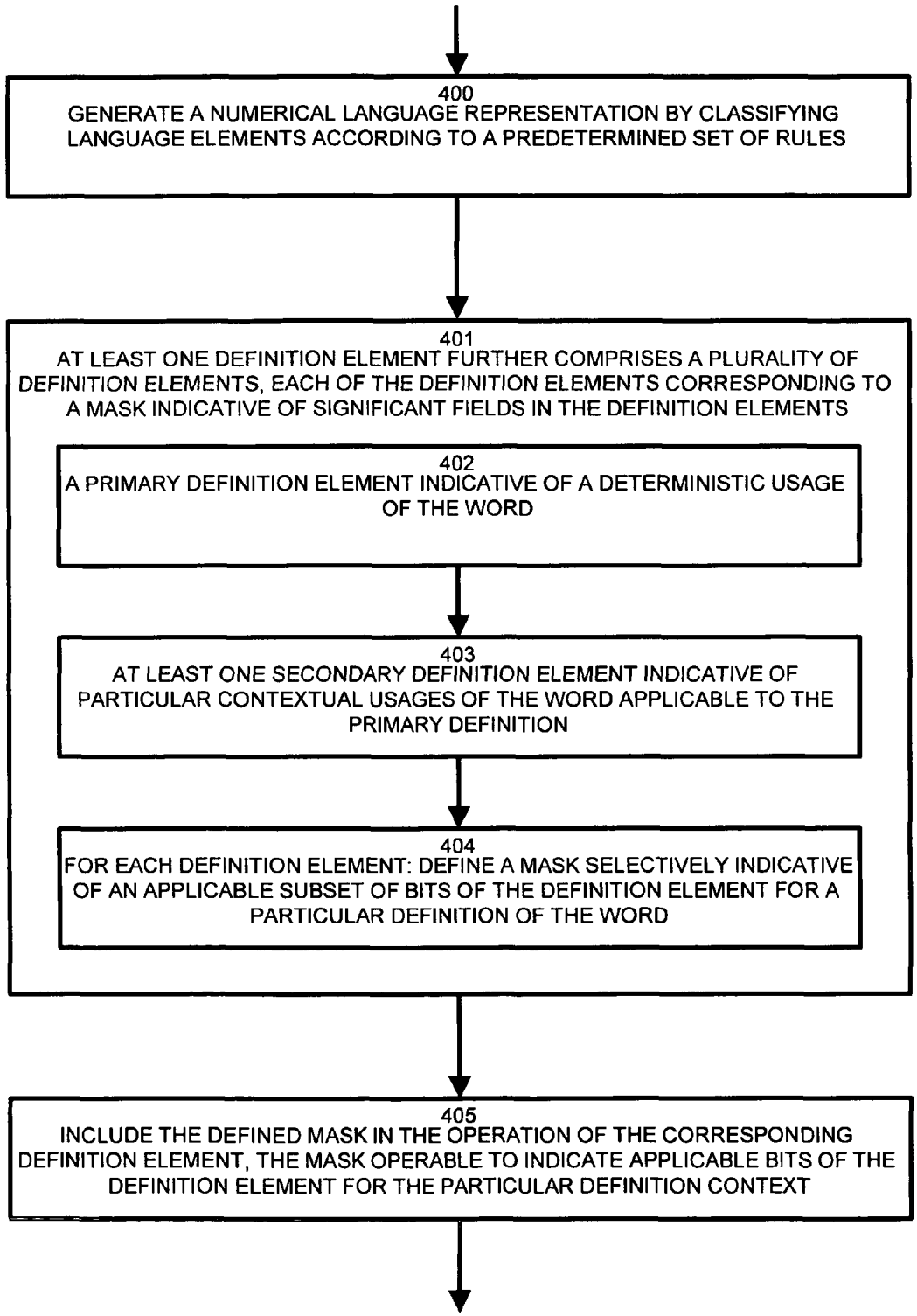
FIGS. 7a-7c are a flowchart of definition element processing using the values as defined in FIGS. 6a-6b.
Figure 7B:
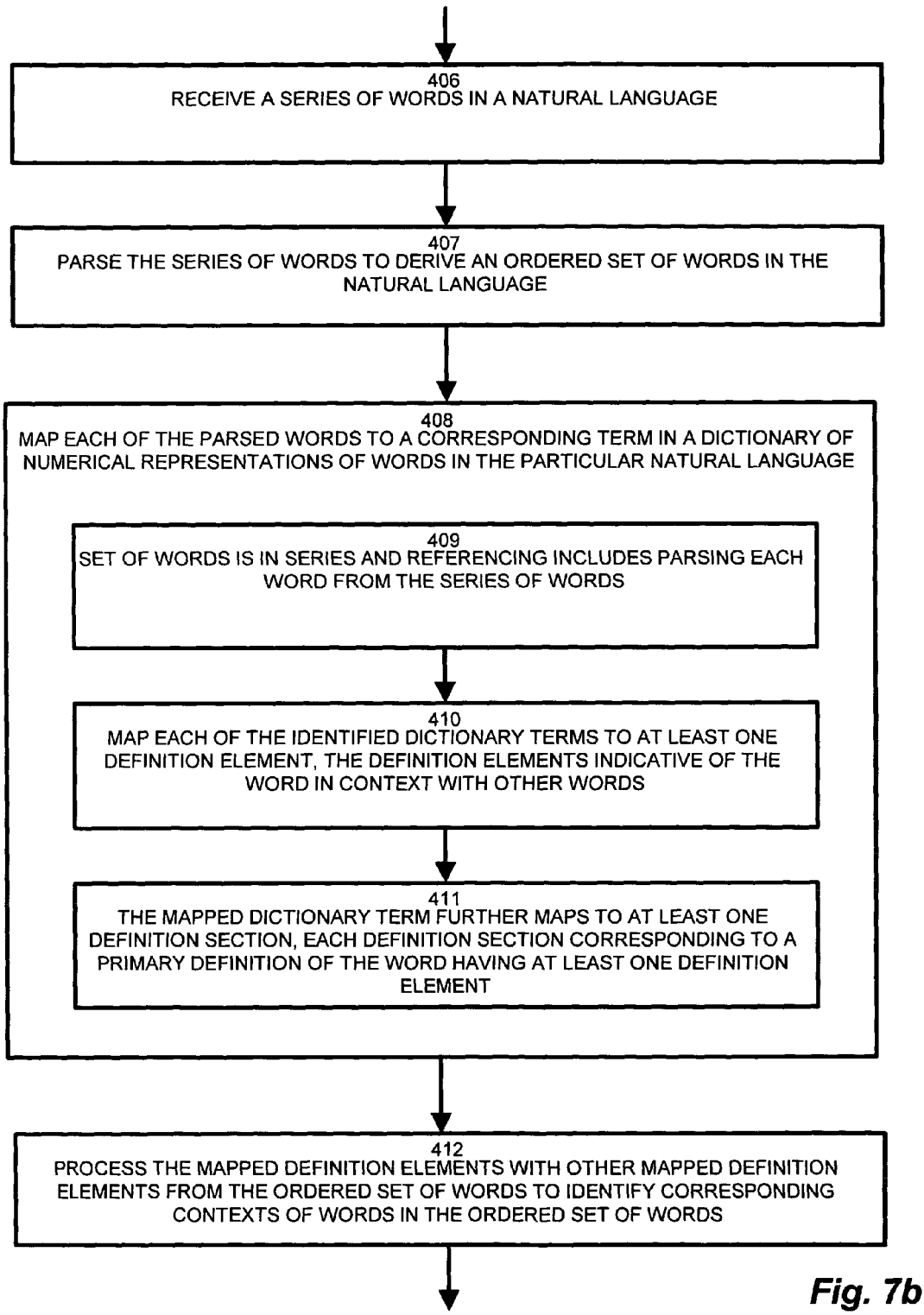
Figure 7C:
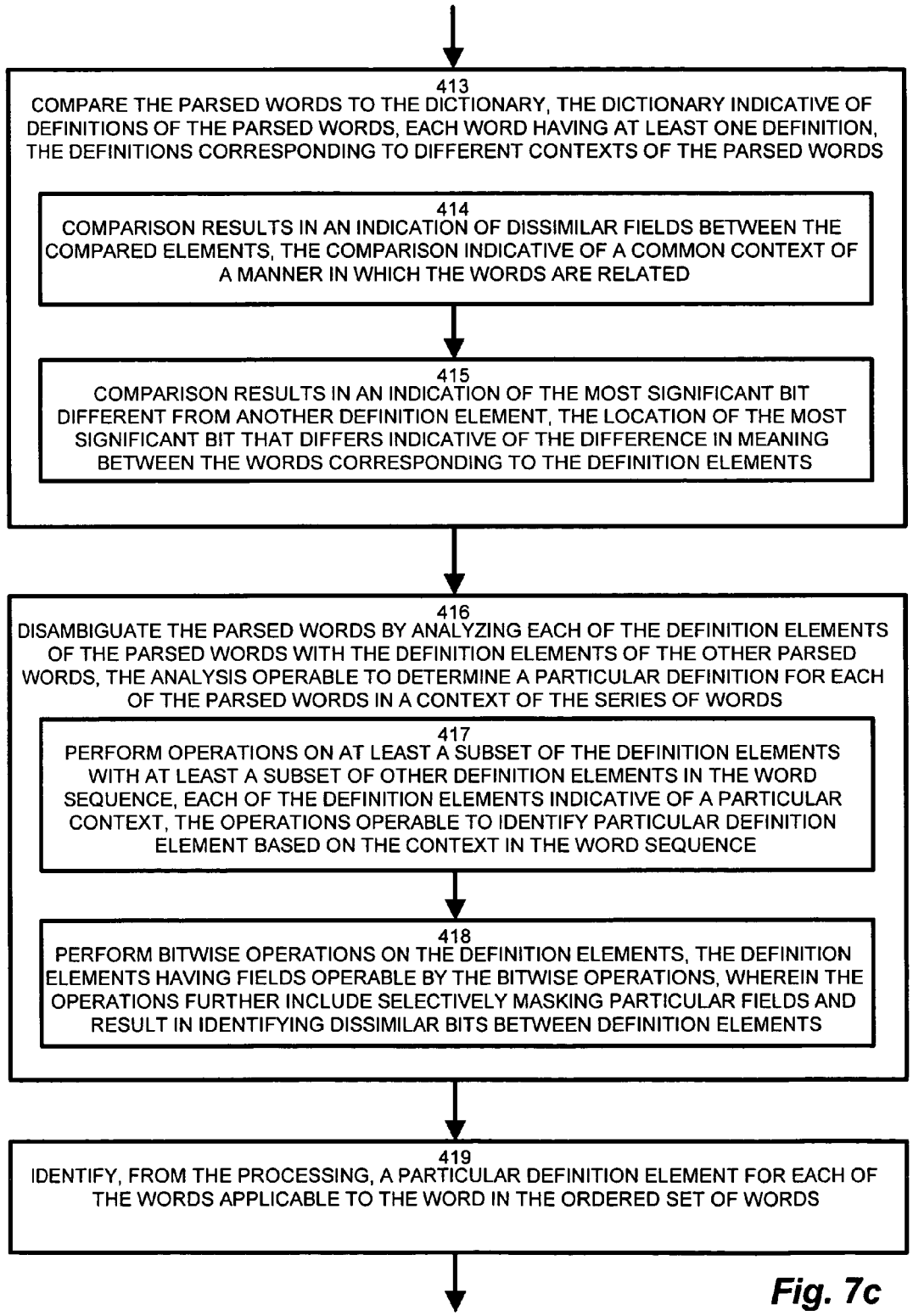

FIGS. 7a-7c are a flowchart depicting the processing of the generated definition elements by performing computations on the definition elements and fields therewithin. Referring to FIGS. 1, 3 and 7a-7c, at step 400, a numerical language representation is generated as above in FIGS. 4a-4c. by classifying language elements according to a predetermined set of rules 118. In the resulting dictionary of definition elements 116, some of the definition elements 124 further comprises a plurality of definition elements, each of the definition elements corresponding to a mask indicative of significant fields in the definition elements, as depicted at step 401. The definition elements may include a primary definition element indicative of a deterministic usage of the word, as shown at step 402, and at least one secondary definition element indicative of particular contextual usages of the word applicable to the primary definition, as depicted at step 403. The generated definition elements 124 further include, for each definition element 124, a mask 126 selectively indicative of an applicable subset of bits of the definition element for a particular definition of the word, as shown at step 404.

The machine vocabulary processor 160 includes the defined mask 126 in the operation of the corresponding definition element 124, such that the mask is operable to indicate applicable bits of the definition element for the particular definition context, as disclosed at step 405.

At step 406, the machine vocabulary processor 160 receives a series of words in a natural language, such as a sentence, as depicted at step 406. The processor 160 parses the series of words to derive an ordered set of words in the natural language, as shown at step 407. The disambiguator 170 maps each of the parsed words 144 to a corresponding term in a dictionary 162-N of numerical representations of words in the particular natural language, as depicted at step 408. In the exemplary arrangement, the set of words 142 is in series (i.e. a sentence) and referencing includes parsing each word 144 from the series of words 142, as shown at step 409. Using the dictionary appropriate to the natural language of the word series 142, the disambiguator maps each of the identified dictionary terms 144 to at least one definition element pair 136 (definition element), in which the definition elements are indicative of the word in context with other words, as shown at step 410. The mapped dictionary term 144 further maps to at least one definition section 180, as depicted at step 411, each definition section corresponding to a primary definition of the word having at least one definition element 136.

The disambiguator 170 processes the mapped definition elements 144 with other mapped definition elements 144-N from the ordered set of words 142 to identify corresponding contexts of words in the ordered set of words, as shown at step 412. Such processing includes, at step 413, comparing the parsed words 144 to the dictionary 162-N, in which the dictionary is indicative of definitions (definition elements 124) of the parsed words 142, where each word has at least one definition, and in which the definitions correspond to different contexts of the parsed words. The comparison results in an indication of dissimilar fields between the compared elements 124, such that the comparison is indicative of a common context of a manner in which the words are related, as shown at step 414. Therefore, the values of the definition elements, when compared to other definition elements, indicates definition elements (i.e. word usages) having a similar context by a relatively small difference. In further detail, the comparison results in an indication of the most significant bit different from another definition element, such that the location of the most significant bit that differs is indicative of the difference in meaning between the words corresponding to the definition elements, as depicted at step 415.

The disambiguator 170 disambiguates the parsed words 144 by analyzing each of the definition elements 136-N of the parsed words 144-N with the definition elements 136-N of the other parsed words 144, in which the analysis is operable to determine a particular definition for each of the parsed words in a context of the series of words 142, as shown at step 416. Disambiguating further includes performing operations on at least a subset of the definition elements 136-N with at least a subset of other definition elements 136 in the word sequence 142, in which each of the definition elements 136 is indicative of a particular context, such that the operations are operable to identify a particular definition element based on the context in the word sequence 142, as depicted at step 417. Performing such operations includes performing bitwise operations on the definition elements, in which the definition elements have fields operable by the bitwise operations, such that the operations further include selectively masking particular fields and result in identifying dissimilar bits between definition elements 136, as disclosed at step 418. The result identifies, from the processing, a particular definition element 234 for each of the words 244 applicable to (i.e. setting the context) the word in the ordered set of words 142. Therefore, the disambiguating identifies a proper definition element 124 from among a number of possible definitions 180-N for each of the words 144 in the sentence 142.

Figure 9A:
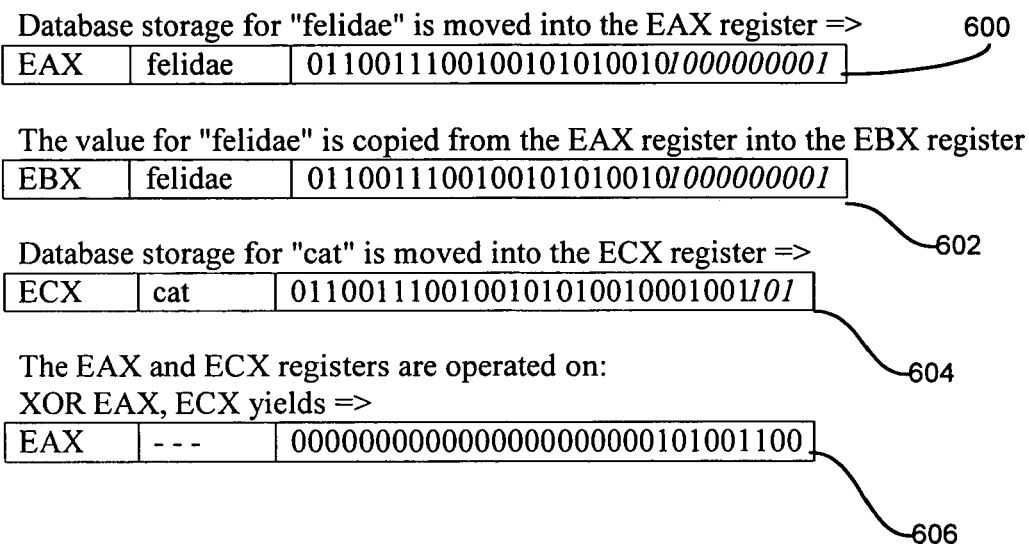
Figure 10A:
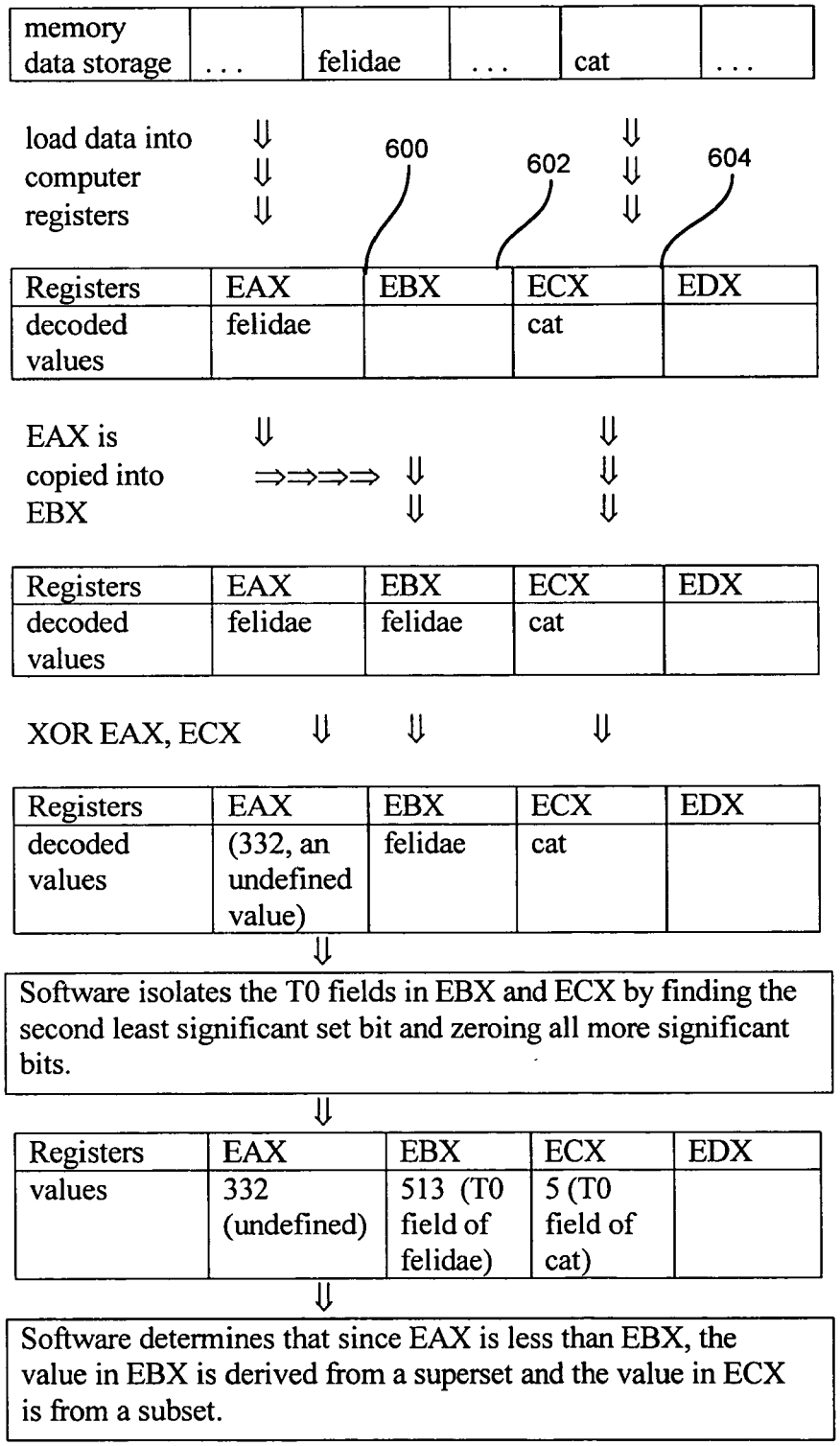
FIGS. 10a-10c are data flow diagrams depicting the processing performed by the bitwise operations as in FIGS. 9a-9c.
Figure 10B:
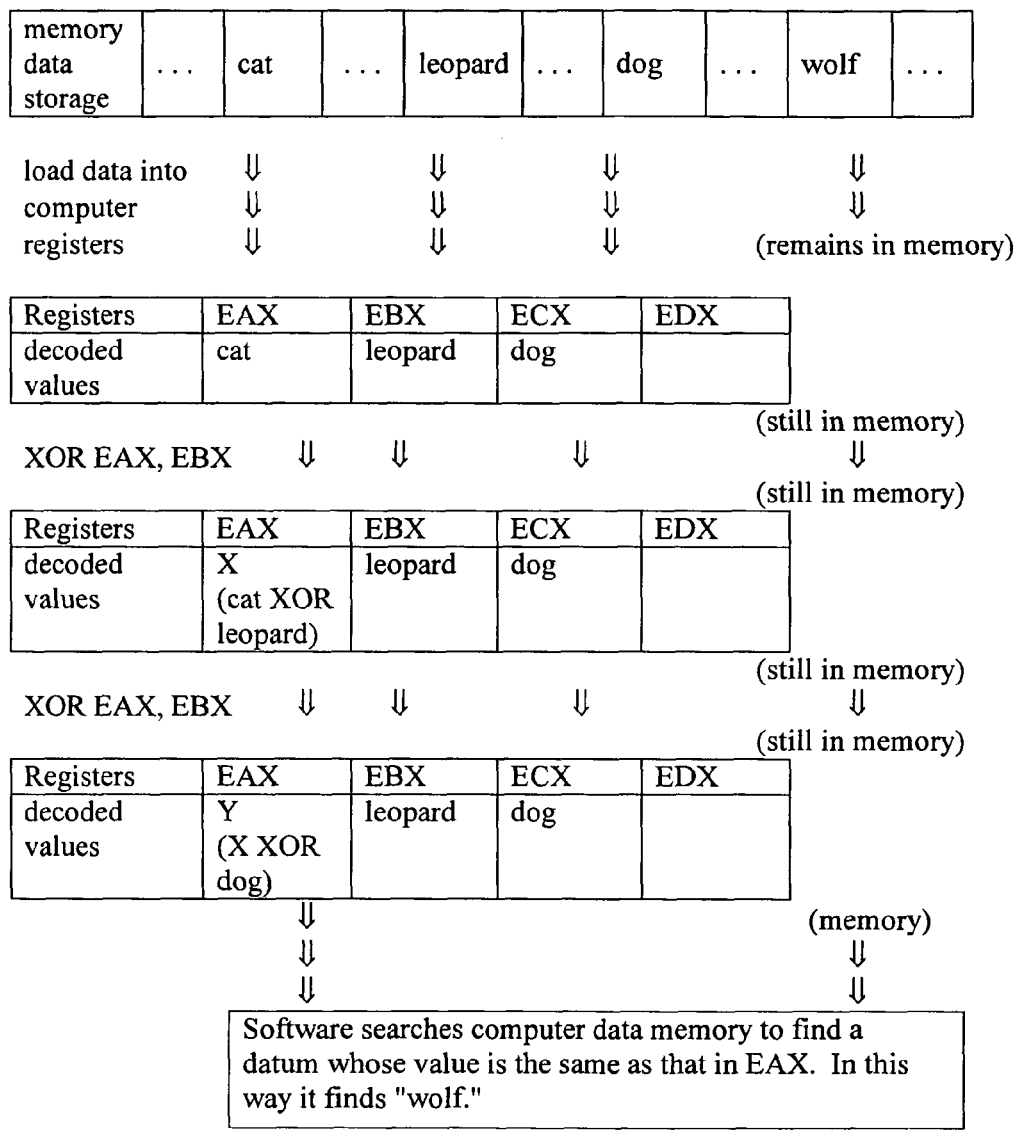
Figure 10C:
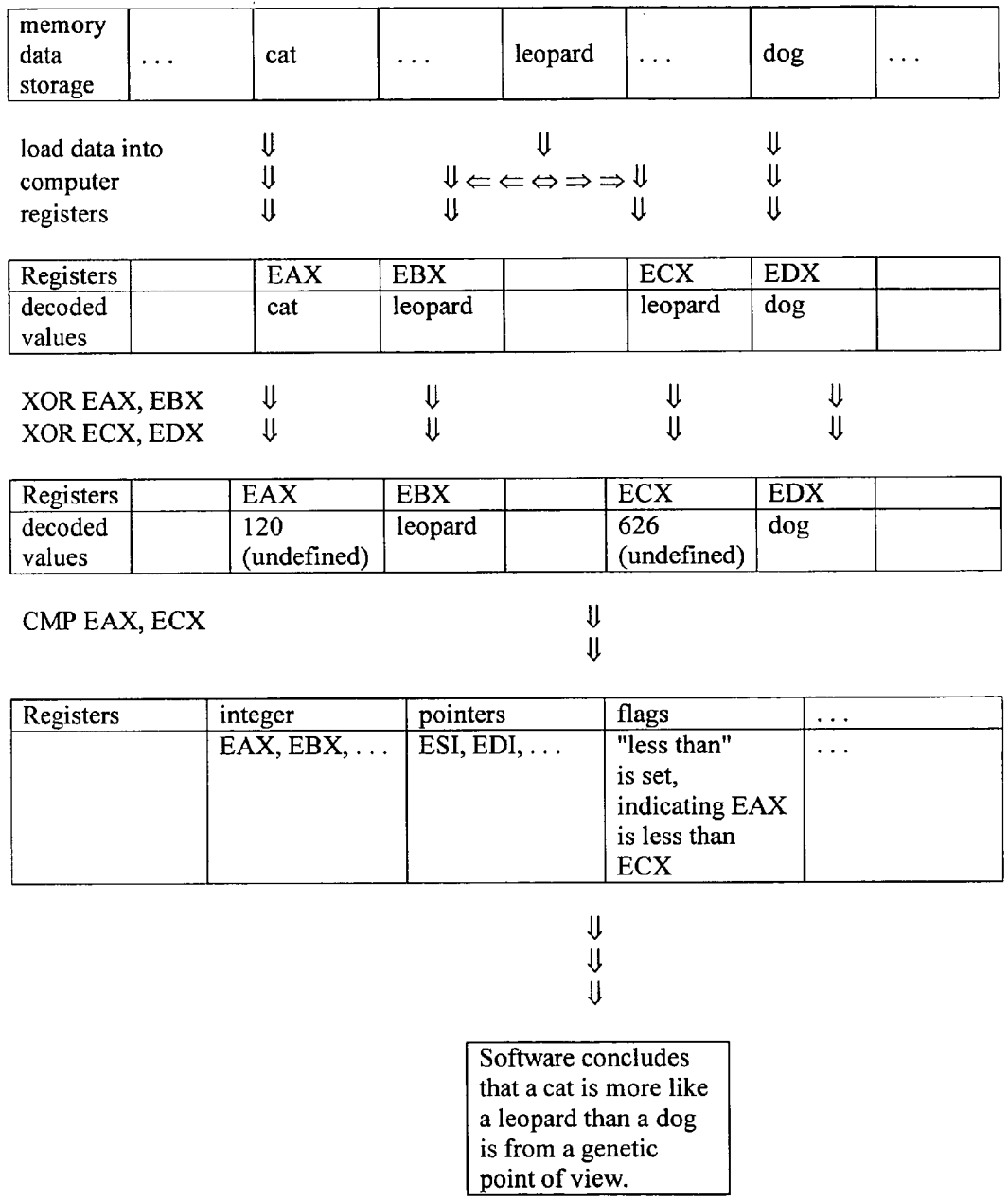

FIGS. 8a-8g depict the population of definition element fields with values from the word lists in FIGS. 4a-4f. FIGS. 8a-8n are diagrams of definition elements generated by the process depicted in the flowcharts of FIGS. 4a-4f. FIGS. 9a-9n are diagrams of bitwise operations using the definition elements from the processing of FIG. 3. FIGS. 10a-10c are data flow diagrams depicting the processing of definition elements in FIGS. 8a-8n.

FIG. 8a shows an exemplary classification as a definition element 500 for the natural language term "leopard." It is MTD 0 because it is the only definition type that can stand alone and is required for every word. Every word will have precisely one definition element of this method value, and so it can be used to begin or terminate a list of definition elements. This definition of "leopard," decoding as "dangerous wild cat," illustrates a multiple taxonomy. FIG. 8b shows the relation between the foundation field in the list from FIG. 7a to the class and category field discussed above. The value for foundation from FIG. 8b depicts an 8 bit quantity expressed in hexadecimal 510. When expressed as a binary value 512, the high 3 bits 514 correspond to the class field 518, and the low 5 bits 518 correspond to the category field 520. Expressing the high three bits as a separate value yields a class value 522 of 5, corresponding to the class field 526 of 5. Similarly, expressing the low 5 bits 518 yields a value of 10 decimal, or A hex 524, which corresponds to the category field of the definition element 500.

FIG. 8c shows a second definition element 504 for "leopard." The definition of leopard in FIG. 8b is applicable for operations on words with a CLA field 530 of 3, and each element of the definition must be operated on with an element from another definition of the same method and scope. If the method 0 elements of "leopard" are XORed with the method 0 elements of "house cat" and the result XORed with the method 0 elements of "wolf," the result will be identical to the method 0 elements of "domestic dog." FIG. 8d shows another definition section 504. In this definition section, subsequent method 0 532 definition elements continue defining the animal with different scope (SCO) values 534. The second definition element 504 for "leopard," using scope 2, decodes as "mammal with sharp claws and solitary hunter".

Therefore, a simple taxonomy can be used to determine relations with respect to that taxonomy. For example, the word leopard can be understood, in terms of this taxonomy to see how closely leopards are genetically related to other species. Leopard, definition word 1, decodes as "leopard" and only pertains to that animal (see "leopard" in Table 2).

This definition for the word can only be operated on by other words having a CLA of 3 and an MTD of 1. If the word for leopard is XORed with the word for some other organism, we can see how closely related they are by finding the location of the most significant bit in the result and what field that lies in. In FIG. 10a we see a comparison between cat and felide that results in the understanding that a cat is a type of felide. In FIG. 10c we see that a leopard is more closely related to a cat than it is to a dog.

Note that the entire class of animal will have 4 bits for orders, but the various orders will have varying numbers of bits for families, as needed, and these, in turn will have varying numbers of bits for the various genera within them. The taxonomy does not require that all species be present, or that any node be fully defined, provided that the size is established, and it does not require that all fields be uniform in size.

The variation in size is known by finding the named nodes (e.g., names for genera, families, orders, or classes) and examining the masks. Higher-level nodes will have the terminal value following their last significant field, and this is in the final, T0, field, which is a placeholder and has no meaning. When the definition element is established, its mask is created, and in the mask all bits for fields other that T0 are set to 1, those of T0 being unset, or 0. Such an alternate taxonomy is discussed further below with respect to the definition elements in FIGS. 9a-9b and 10a-10c.

As indicated above, the method field affect the structure and usage of other fields in the definition element. Method 2 definition elements are defined and decoded identically with those of method 0. The difference is one of usage. Method 2 elements do not define a words but rather provide a context for the word or and object of the word. Thus, the definition of "sedan" might include method 2 definitions including "travel" and "land" and "road". Contexts being broadly defined, the first two of these actual definitions given would probably have their CXT, AUX1, and AUX2 fields zeroed out, and the FND field of the first would be broadly defined as "motion," with the mask set to include "travel." The FND field for the second would remain "land." The third, however, would leave the FND at "way," which it is for road, and further fill in the other fields to provide a definition saying it is a land based avenue for vehicles. This would make it clear that various words for motion, such as arrive, progress, return, etc., will establish a context, but geographical terms not referring to land will not, and neither will ways other than those for vehicles—the sedan is not an off-road vehicle.

This provides a level of detail not usual in human speech. We have the word hammer, and we have "claw hammer" which is better defined as a single "word" in the machine vocabulary than as the sum of its components "claw" and "hammer." If we see "hammer," in the context of "nail," however, we can usually be assured that the hammer is a claw hammer. One of the contexts of "claw hammer" is "nail." This means that if a language does not have a common term for "sledge hammer" and "claw hammer" (as English does in the term "hammer"), we can still disambiguate the term to the term for "claw hammer" for that language when we only see the English word "hammer" in a context that includes "nail."

It should be noted that for many purposes, complete definitions are unnecessary. For the purpose of translations of vocal conversations, the fact that a horse is a domesticated land animal whose name is spelled uniquely is, together with broadly defined method 2 definitions, sufficient to provide the word representing it with unambiguous meaning.

The above description presents the mechanism of employing logical (mathematical) operation on the definition elements for performing comparisons and equality computations. In a simple taxonomy, XORing two values, not producing an error condition, indicates that the values are more or less related. If the "leopard" definition element of method 1, scope 0, is XORed against "housecat" of the same method and scope, the most significant bit set in the result, X, will be in the area of the genus definition, indicating that they are of different genus but of the same family (see FIG. 10c). By searching defined taxonomy nodes for supersets of either "cat" or "leopard" to find the one with the narrowest mask field that is big enough to contain all the set bits in X, we can find "felidae", the family of which both genera are members (see FIG. 10a). If we XOR "leopard" against "dog" to get result Y, we can evaluate X and Y integers, and the information that Y is the larger than X indicates that a leopard is more closely related to a housecat than to a dog.

|  | CLA | MTD | CAT | SCO | NEG | CXT | AUX1 | AUX2 |
|---|---|---|---|---|---|---|---|---|
| land vehicle | mech. | 0 | vehicle | 0 | 0 | land | (0) | (0) |
| motor vehicle | mech. | 0 | vehicle | 0 | 0 | (0) | (0) | motor |
| passenger veh. | mech. | 0 | vehicle | 0 | 0 | (0) | human | (0) |
| car | mech. | 0 | vehicle | 0 | 0 | land | human | motor |
| taxicab | mech. | 0 | vehicle | 0 | 0 | land | human | motor |
| truck | mech. | 0 | vehicle | 0 | 0 | land | cargo | motor |
| rickshaw | mech. | 0 | vehicle | 0 | 0 | land | human | human |
| motorboat | mech. | 0 | vehicle | 0 | 0 | water | (0) | motor |
| gondola | mech. | 0 | vehicle | 0 | 0 | water | (0) | human |
| skiff | mech. | 0 | vehicle | 0 | 0 | water | human | human |

We can evaluate set relationships. By examining car and motor vehicle, we see that they differ in the CXT, and AUX1 field. Motor vehicle has the general 0 in these fields where car has a non-zero value, and the other fields have common values, with no fields differing in non-zero values. This indicates that motor vehicle is a superset of car—car is a subset of motor vehicle.

| motor vehicle | mech. | 0 | vehicle | 0 | 0 | (0) | (0) | motor |
|---|---|---|---|---|---|---|---|---|
| car | mech. | 0 | vehicle | 0 | 0 | land | human | motor |

The CPU operations required to do this job are (after a simple test for equality of motor vehicle and car, which fails) to take the value of car, logically AND it with the value of the mask for motor vehicle, both of these masks are populated with zeros for every one of the CXT, AUX1 and AUX2 fields in their relative words that have zero values; for all other fields they are populated by ones (different masks are possible, but this happens to be the case with these). When the value of car is ANDed with the mask of motor vehicle, the result equals the value of motor vehicle. This means that the value of car represents a subset of the value of motor vehicle.

By examining taxicab with truck, we see that they differ in one field, where they both have non-zero values. This means that a taxi is very like a truck (both motorized land vehicles) but the sets are discreet, their union does not exist, and there is no possibility of a taxi that is a truck.

| Taxicab | mech. | 0 | vehicle | 0 | 0 | land | human | motor |
|---|---|---|---|---|---|---|---|---|
| truck | mech. | 0 | vehicle | 0 | 0 | land | cargo | motor |

The CPU operations required for this operation are (after a simple test of equality of taxicab with truck, which fails) to AND the value of each, taxicab and truck, with the mask of the other, then check the result with the other for equality. We get equality in neither set of operations, which tells us that the neither value is a subset of the other. We XOR the values of taxicab and truck, and test each field of the results, FND, NEG, CXT, AUX1, and AUX2, to see if they are zero, deriving information as we go. Since FND, NEG and CXT are zero in the result, we know the two are fairly closely related. Since one of the remaining fields differ, they are closer yet. But the difference in the final field, which we test for each and find is non-zero in each value, tells us that the two sets are disjunct.

By examining motor vehicle with passenger vehicle, we see that they differ in that each has a non-zero field where the other shows a 0 value. This indicates that neither is a superset of the other, but that the union may exist, which we may find by ORing the values:

| motor vehicle | mech. | 0 | vehicle | 0 | 0 (0) | (0) | motor |
|---|---|---|---|---|---|---|---|
| passenger veh. | mech. | 0 | vehicle | 0 | 0 (0) | human | (0) |
| U | mech. | 0 | vehicle | 0 | 0 (0) | human | motor |

The union, U, decodes as motorized passenger vehicle.

The method may find analogy relationships. This is done by taking advantage of the nature of XOR (if a XOR b=c then a XOR c=b and b XOR c=a), and the fact that our definitions are actually numerical representations.

If we XOR car with motorboat to get result X, the values we get are:

| car | mech. | 0 | vehicle | 0 | 0 | land | human | motor |
|---|---|---|---|---|---|---|---|---|
| motorboat | mech. | 0 | vehicle | 0 | 0 | water | (0) | motor |
| X |  | 0 |  | 0 | 0 |  | N | human | 0 | where N is land XOR water. The fact that there are no bits set in the CLA, MTD and SCO fields indicates no error of class, method, or scope has occurred, i.e., the result should be valid.

If we then XOR this result with rickshaw to get result Y, the values we get are:

| X |  | 0 | 0 | 0 | 0 | 0 N | human | 0 |
|---|---|---|---|---|---|---|---|---|
| rickshaw | mech. | 0 | vehicle | 0 | 0 | land | human | human |
| Y | mech. | 0 | vehicle | 0 | 0 | water | (0) | human |

Y decodes as gondola. The implication is (if we use only this list of definitions), "As a car is to a motorboat, so is a rickshaw to a gondola." Clearly, using elements of other SCO values, and having a larger list of words, the result would be more complicated but the example is valid.

It should be noted that in order to see that the result is accurate, Y should be compared to the original values, car and motorboat, to see that each field value in Y is represented in at least one of the original values.

Configurations herein provide an ability to disambiguate words of the same spelling or sound by tracking contextual information. This is done by comparing words that need to be disambiguated with the context information of words already known to be in use.

In Japan, there is a famous term, "hashi no hashi," which is used to indicate ambiguity. The word "hashi" has three potential meanings, "bridge," "chopstick, and "end." Thus "hashi no hashi" can mean any of the following:

bridge of a bridge bridge of a chopstick bridge of an end chopstick of a bridge chopstick of a chopstick chopstick of an end end of a bridge end of a chopstick end of an end A human being can disambiguate these to the point of recognizing that the only the final three meanings are possibly valid. Within a broader context, selecting on of those three is easy. Historically, this problem has been impossible for a computer to deal with.

If we look at the definition for the three words in question, however, we see the following (only method 0, scope 0 elements and method 2, scope 0 elements are shown, and only the meaning of "end" that is a possible translation for "hashi" are used):

|  | CLA | MTD | CAT | SCO | NEG | CXT | AUX1 | AUX2 |
|---|---|---|---|---|---|---|---|---|
| bridge | 6 | 0 | 0Ah | 0 | 0 | 25h | 2Eh | 28h |
| context: geography | 4 | 2 | 18h | 0 | 0 | 0 | 0 | 0 |
| mask | 7 | 3 | 18h | 3 | 0 | 0 | 0 | 0 |
| context: motion and travel | 7 | 2 | 08h | 0 | 0 | 0 | 0 | 0 |
| mask | 7 | 3 | 18h | 3 | 0 | 0 | 0 | 0 |
| chopstick | 5 | 0 | 01h | 0 | 0 | 2Eh | 16h | 21h |
| context: food matter | 4 | 2 | 10 | 0 | 17h | 0 | 0 | 0 |
| mask | 7 | 3 | 17 | 3 | 3Fh | 0 | 0 | 0 |
| context: food action | 7 | 2 | 14h | 0 | 0 | 0 | 0 | 39h |
| mask | 7 | 3 | 1Fh | 3 | 0 | 0 | 0 | 3Fh |
| end | 0 | 0 | 0Ch | 0 | 1 | 05h | 0 | 0 |
| context: number | 0 | 2 | 08h | 0 | 0 | 0 | 0 | 0 |
| mask | 7 | 3 | 18h | 3 | 0 | 0 | 0 | 0 |
| context: relation | 0 | 2 | 10h | 0 | 0 | 0 | 0 | 0 |
| mask | 7 | 3 | 10h | 3 | 0 | 0 | 0 | 0 |
| context: matter | 1 | 2 | 10h | 0 | 0 | 0 | 0 | 0 |
| mask | 7 | 3 | 10h | 3 | 0 | 0 | 0 | 0 |
| context: mechanism | 2 | 2 | 00h | 0 | 0 | 0 | 0 | 0 |
| mask | 7 | 3 | 00H | 3 | 0 | 0 | 0 | 0 |
| context: space | 6 | 2 | 00h | 0 | 0 | 0 | 0 | 0 |

-continued

|  | CLA | MTD | CAT | SCO | NEG | CXT | AUX1 | AUX2 |
|---|---|---|---|---|---|---|---|---|
| mask | 7 | 3 | 00h | 3 | 0 | 0 | 0 | 0 |
| context: motion | 7 | 2 | 08h | 0 | 0 | 0 | 0 | 0 |
| mask | 7 | 3 | 18h | 3 | 0 | 0 | 0 | 0 |

A context datum and a mask datum combine to give us a range within which the context is valid. Thus if we take the context of food action from chopstick, it and its mask provide a range of contexts. In the mask, every field that has a non-zero value has the highest possible value for that field, i.e., every bit in the field is set. When a value for a word is ANDed with this mask, the values it takes will be zero for all zeroed fields and whatever they are for that word for the rest. When the result is compared with the context value for food action, it either is or is not equal. If it is equal, then the words is a food action, and within the context of chopstick otherwise it is not. Note that the precise values of 14h in CAT and 39h in AUX2 are required.

On the other hand, if we take the context of motion from end, it and its mask provide a somewhat different type of range for the words that match. The same operations are done as in the above example, but the mask has zeros in the least significant bits of CAT. This means that words will match without regard to these bits. The basic words "travel," whose CAT value is 1Ah, "progression," whose CAT value is 1Bh, and "ingress," whose CAT value is 1Fh all will match, among others. On the other hand, the values below 10h in CAT will not match, and neither will values above 6 in CAL. Thus the mask controls how narrowly or broadly a match to a context is required. The mask requires any context value to have a 7 in CLA, a 2 in MTD, a 0 in the most significant bit of CAT, a 1 in the second most significant bit of CAT, and a 0 for the value in SCO, but is indifferent to the remaining bits of the value.

If we list the method 0, scope 0 FND values of bridge, chopstick, and this meaning of end, and list the FND values of their contexts together with the ranges, we get the following:

| word | FND | context | FND | range |
|---|---|---|---|---|
| bridge | CAh | geography | 98h | 98h-9Fh |
|  |  | motion | E8h | E8h-EFh |
| chopstick | A1h | food | 90h | 90h-97h |
|  |  |  |  | (restricted further) |
|  |  | eating | 14h | 14h-14h |
|  |  |  |  | (restricted further) |
| end | 0Ch | number | 08h | 08h-0Fh |
|  |  | order, relation | 10h | 10h-1Fh |
|  |  | matter | 98h | 90h-9Fh |
|  |  | mechanism | A0h | A0h-BFh |
|  |  | space | C0h | C0h-D0h |
|  |  | motion | E8h | E8h-EFh |

A FND value of CAh for bridge fits within the space context range for end, thus "end of a bridge" might make sense. The FND value of A1h for chopstick fits within the mechanism context for end, so "end of a chopstick: might make sense. The FND value of 0Ch for end fist within the context range for number of end, and thus "end of an end" might make sense. These are the only combinations that fit within the context ranges of these words, so other possible combinations are discarded. By applying the contexts and FND values of other words in a sentence or paragraph, further narrowing of possibilities can be done.

Configurations herein, therefore, represent human language in accurate, machine operable form. This ability to disambiguate meanings of words rapidly will combine with voice and parsing technology already in use in such a way as to make nearly instantaneous translation of vocal conversations possible. Taking data from a data stream, such as a voice communication going through a telephone, the technology of the machine vocabulary can be integrated into parsing software, which renders a translation of the data stream into a machine-based language in which the information as to word relationships, parts of speech, usage of declinations, conjunctions, and so on, is maintained as a data structure, such as a parse tree, within which the meanings of words are represented by unique indices of the words of the machine vocabulary technology.

To illustrate this operation, we could take the compound sentence, "I finished dinner, got up from the table, and walked to the wall." A parser tells us that dinner, table, and wall are nouns, and therefore have noun definitions and contexts. The definition of dinner says that it is an event with a context of food matter. The definitions of table are (1) a thing that is written with a context of meaning, number, or relationship, (2) a solid object on which things are written, with a context of meaning, custom, and religion, (3) a structure used to support things with contexts of materials, especially food matter, and tools, (4) an ornamental plane surface, with a context of beauty, (5) a surface used for a game, with the context of game, (6) a group of people, with a context of human and group, (7) a meal, with the contexts of food material and eating. A wall is defined as a structural part and (for the English word) has no contexts defined.

After the initial parsing, software determines that it has the meaning of dinner, given the context of dinner, it chooses meanings 3 (structure) and 7 (meal) as the possible definitions of table in use. The meaning of wall is given. The software builds a parse tree for the sentences, providing nodes marking the parts of speech and usage of each word together with nodes providing indices or pointers to the meanings of the words. The meaning of table is marked as ambiguous with two possible definitions. The form of the parse tree is a machine based language into which the English has been translated and which can be parsed into human language. When the compound sentence given is parsed into German, there is no equivalent of the word "wall," but rather two translations, one meaning "supporting structural barrier," with a context of structure, and one meaning, "area barrier," with a context of "geography." since there is a possible contextual relationship with one of the words for table, it chooses the former meaning, and uses the number 3 (structure) definition of table. This may or may not be what the speaker of the sentence intended, but if a mistake was made, it was the same mistake a human translator would make. Human beings often ask for clarification in conversations, and computers cannot be expected to do better in human languages than humans would.

This operation can be done by a computer which resides, together with the software and the dictionary for the technology, on a chip in the telephone or other devise, the translation facility relating the machine based language to the user of the telephone (e.g., the chip translates between English and the machine based language for an English speaking user). The machine translation of the data stream is then passed to another telephone or other devise equipped with the same type of chip, but in which the software relates to the particular user of that telephone (e.g., a user who speaks Japanese). That telephone's software translates the data stream into its user's language. Its user can then speak, having his meaning translated similarly for the first.

From this overview, it follows that various implementations for understanding and computing language based results may be performed using the definition elements. FIGS. 8*l*-8*w* show alternate examples of definitions of animals using a simple primary taxonomy, method 1 in the description above. The value in T0 is not decoded as meaningful and is explained in the text. Note that the field name class refers to the biological class of the animal. FIGS. 10*a*-10*j* below illustrate an alternate arrangement for definition elements for performing exemplary computations.

Referring to FIGS. 8*u* and 8*r* and the bit diagrams in FIG. 9*a*, a comparison resulting in the understanding that the first object, a cat, is a type of the second object, felidae. The T0 fields of cat and felidae are italicized. Because the result of the XOR (332) is smaller than twice the value of the T0 field of felidae minus 1 (1024), we can see that the object XORed with felidae is a type of felidae. Put another way, the position of the most significant set bit in the result falls within the location of the T0 field of felidae. Thus, a cat is a type of felidae.

Referring to FIG. 9*a*, software isolates the T0 fields in EBX 602 and ECX 604 and compares the results with EAX 600, leaving these values in EBX and ECX respectively. Since the result for EBX 602 is greater than the value for EAX 600, the type associated with EBX 602 is seen to be a superset of that in ECX. The fact that ECX is less than EAX indicates that the value associated with ECX is not a superset. If both EBX and ECX were smaller, then neither would be associated with a superset of the other. The data flow sequence is shown in FIG. 10*a*.

FIG. 9*b* shows bitwise operations on values of MTD set 0. Since XOR is a bitwise operation, the fields can be XORed as fields. The values for the fields are taken from FIGS. 8*h*, 8*o*, 8*n* and 8*u*. This operation tells us "As a cat is to a leopard, so is a dog to a wolf." It is an imperfect analogy, but since it is known to be incomplete at the time it is made, refinement is possible, if needed. The data flow is illustrated in FIG. 10*b*.

Referring to the definition elements of FIGS. 9*b* and 10*b*, bit operations show how closely MTD set 1 definitions are related. The values of the fields are taken from Table 2, and the T0 fields are italicized. The integer value of the result of two MTD set 1 definitions being XORed can be regarded as a rough indication of how closely those things are biologically related. Since the value of leopard XOR cat is 120, and the value of leopard XOR dog is 626, and 626 is greater than 120, we can know that a dog is probably more distantly related to a leopard than a cat is.

The doubt can be erased by finding the values of the smallest supersets of leopard and cat, on the one hand (as is done in FIG. 10*c*), and leopard and dog on the other. Analysis such as is done in FIG. 10*c* will show that cats and leopards are both felidae, but dogs are not. Furthermore, the least common superset of cat, leopard, and dog is carnivore, and a felidae is a type of carnivore. Thus, a leopard is more closely related to a cat than it is to a dog.

In the example "leopard" and "cat" are moved from storage into registers EAX 610 and EBX 612, and then the XOR operation is executed. Comparing EAX 614 with ECX 616 tells us that EAX has a smaller value, and so represents the comparison of species that are more closely related than those in ECX 620 and EDX 618. FIGS. 9*c* and 10*c* illustrate another similar comparison using the definition elements from FIGS. 8*a*-8*u*.

Figure 4B:
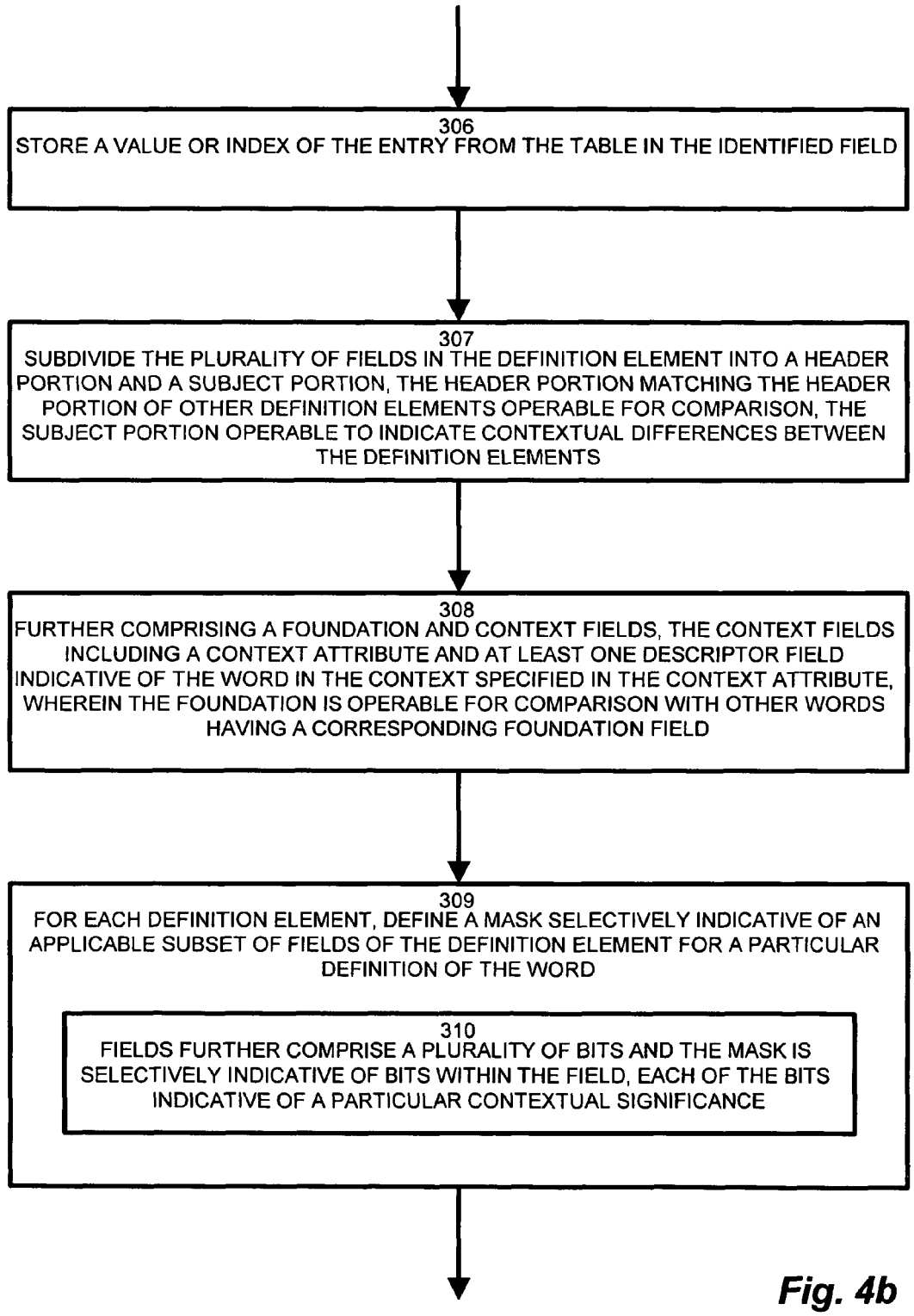
Figure 4C:
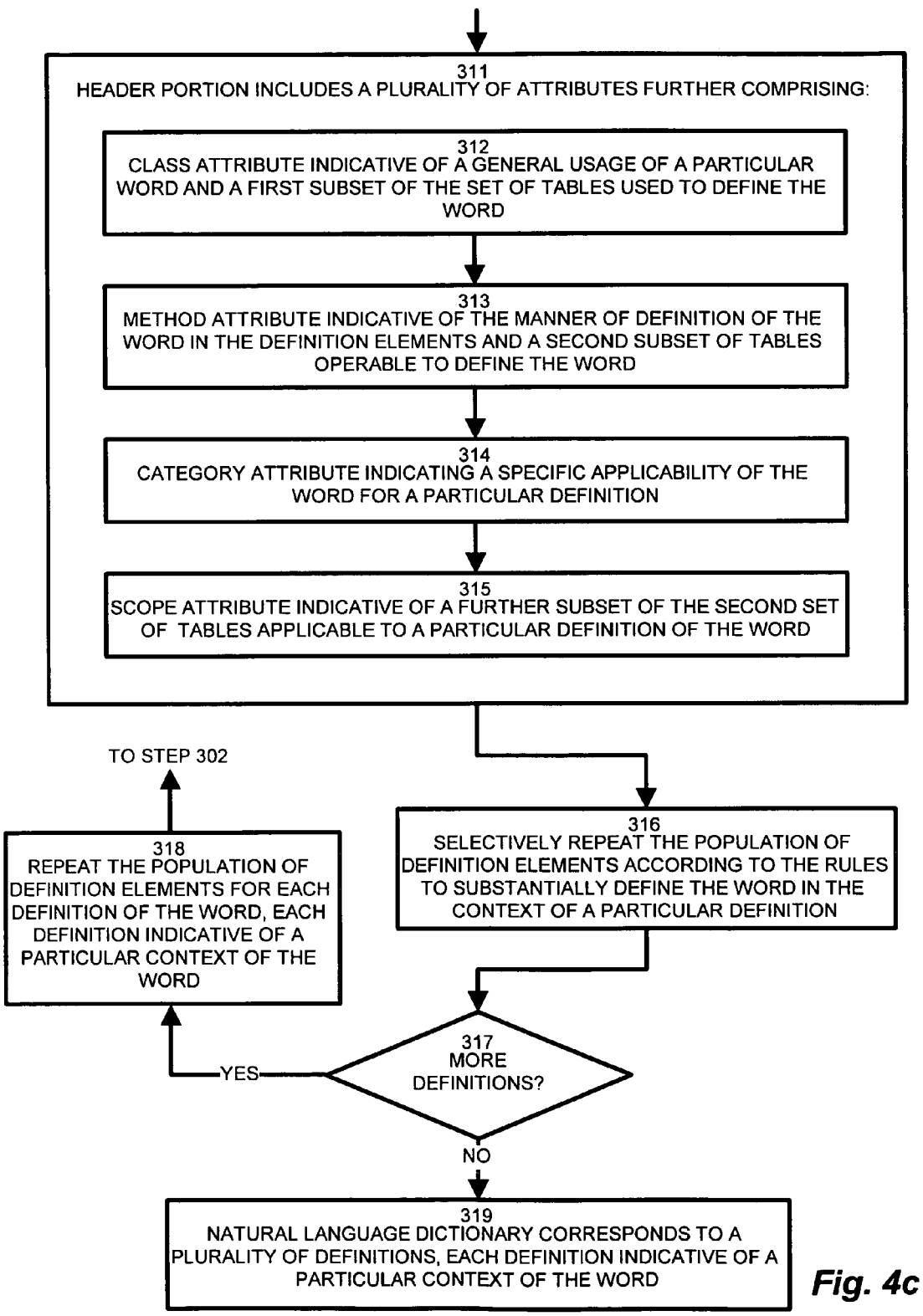
Figure 11:
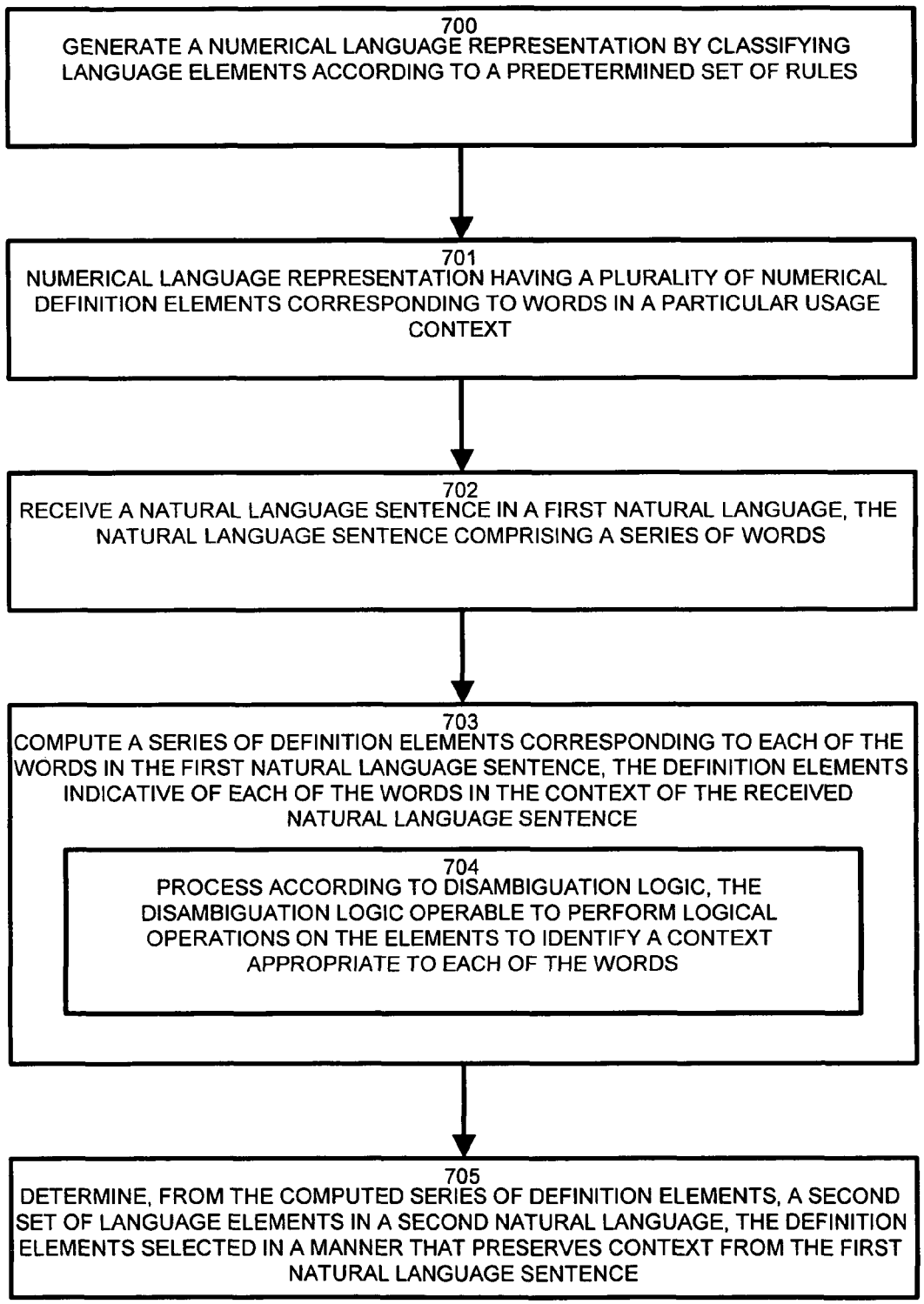
FIG. 11 is a flowchart of translation from one natural language to another.

FIG. 11 is a flowchart of translation from one natural language to another. Referring to FIG. 11, the method of universal translation independent of a native natural language as disclosed herein includes generating a numerical language representation by classifying language elements according to a predetermined set of rules, as depicted at step 700. The machine vocabulary defined by the definition elements is independent of a natural language. The machine vocabulary has significance to a particular language when mapped to a dictionary of words in the target natural language. Accordingly, as indicated at step 701, the numerical language representation has a plurality of numerical definition elements corresponding to words in a particular usage context, as generated by the sequence at steps 300-319 (FIGS. 4a-4c).

Subsequently, the machine vocabulary processor 150 receives a natural language sentence in a first natural language, the natural language sentence comprising a series of words, as depicted at step 702. Therefore, a sentence or other language fragment is received in the source translation language. The machine vocabulary processor computes a series of definition elements corresponding to each of the words in the first natural language sentence, the definition elements indicative of each of the words in the context of the received natural language sentence, as shown at step 703. Therefore, the sentence is expressed in terms of the machine vocabulary by a sequence of definition elements 124. Such computing includes processing according to disambiguation logic, the disambiguation logic operable to perform logical operations on the elements to identify a context appropriate to each of the words, as depicted at step 704. Having the machine vocabulary representation in definition elements 124, the machine vocabulary processor determines, from the computed series of definition elements, a second set of language elements in a second natural language, the definition elements selected in a manner that preserves context from the first natural language sentence, as shown at step 705. The second natural language sentence represents the destination translation language, an is recovered by mapping the definition elements to a dictionary of words and definition elements in that the second natural language.

Those skilled in the art should readily appreciate that the programs and methods for defining, generating and understanding machine vocabulary as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for understanding machine vocabulary has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for representing text in a language independent format of multiple bits and fields of bits comprising:

referencing a word from a set of words into a dictionary of representations of words, in said format of multiple bits and fields of bits, to find a corresponding dictionary term, the set of words derived from a natural language usage defining a natural language context of the words in the set of words;

mapping the referenced dictionary term to at least one definition element indicative of usage of the word in at least one context, the definition elements defining a record of fields;

comparing the mapped definition element to the corresponding fields in the definition elements of other words in the set of words, the comparison operative to identify similar contexts between the definition elements;

disambiguating the referenced words by analyzing each of the definition elements of the referenced words with the definition elements of the other referenced words, the analysis operable to determine a particular definition for each of the referenced words in the context of the set of words, disambiguating including:

performing, with a processor, bitwise operations on at least a subset of the fields in the definition elements with corresponding fields in the other definition elements in the set of words, each of the definition elements indicative of a particular context, the operations for identifying a particular definition element based on the context in the set of words, the definition elements including bit fields of class, method, and category in the high bits, the method field determining a structure of fields in lower order bits, wherein disambiguating is performed on definition elements of equal category and method fields; and identifying, from the comparing, a definition element corresponding to the usage of the word in a context of the set of words.

2. The method of claim 1 wherein the set of words is in series and referencing includes parsing each word from the series of words, further comprising:

comparing the parsed words to the dictionary, the dictionary indicative of definitions of the parsed words in a field structured format defined by the definition elements, each word having at least one definition element, the definitions corresponding to different contexts of the parsed words.

3. The method of claim 1 wherein performing operations includes performing bitwise operations on the definition elements, the definition elements having fields operable by the bitwise operations, wherein the operations further include selectively masking particular fields and result in identifying dissimilar bits between definition elements.

4. The method of claim 1 wherein performing operations includes performing bitwise operations on the definition elements, the definition elements including bits ranging from most significant to least significant, the definition elements having fields operable by the bitwise operations, wherein the operations result in identifying dissimilar bits between definition elements.

5. The method of claim 4 further comprising, for each definition element:

defining a mask selectively indicative of an applicable subset of bits of the definition element for a particular definition of the word; and including the defined mask in the operation of the corresponding definition element, the mask operable to indicate applicable bits of the definition element for the particular definition context, the bitwise operations including one or more logical operations with the mask for nulling inapplicable bits.

6. The method of claim 1 wherein each of the definition elements identifies a particular definition of a word in the context defined by proximate words, each definition element having a context specific definition.

7. The method of claim 6 wherein the definition elements further comprise word lists populated with values defining a bitwise representation that is employed in computations with other definition elements to identify similar contexts in which the words are used.

8. The method of claim 1 wherein the record fields of the definition elements are bit fields, and the comparing includes rules which perform a bitwise operation on particular fields, the operations including XOR between the definition elements and ANDs between the masks of each definition element.

9. The method of claim 1 wherein the record of fields in the definition elements defines an ordered significance to the fields, the most significant bits in the definition element defining the most significant fields.

10. The method of claim 9 wherein the fields of the definition elements include a class field defining the most significant bits, the class defining a title of a list of words from among other classes of words.

11. The method of claim 10 wherein the fields of the definition elements include a method field indicative of the sizes of bit fields for the less significant bits, the method field occupying the lower two bits in the class field in an overlay manner, the class and category filed configured to concatenate to a foundation field, the foundation field being an index of classification into a root word list, the method field defining the structure for less significant fields.

12. The method of claim 10 wherein disambiguating is for determining a degree of difference between words, further comprising:
identifying words having the same values in the class and method fields;
performing an XOR on the definition elements of the identified words;
parsing a result of the XOR to identify the most significant bit; and
identifying the bit field containing the most significant bit to determine the difference between the identified words.

13. The method of claim 1 wherein disambiguating is for determining a subset relation between words, further comprising:
determining the bit mask value from the definition elements;
performing a logical AND on the determined bit mask values;
computing a comparison result of the performed logical AND;
mapping the comparison result back to the definition elements to find a match; and
concluding that a subset relation exists if the mapped comparison result equals the definition element of the superset, each word having a single corresponding definition element for the meaning in context.

14. The method of claim 13 further comprising computing a definition of a word from a plurality of the subset relations comprising:
determining compatible subsets of the word by identifying common values in at least one field defined by the highest bits the compatible subsets;
accumulating an accumulated word by iteratively performing a logical OR on the definition element of the word and the definition element of the subset;
storing the result of each performed logical OR in the accumulated word for each of the determined compatible subsets; and
identifying the value of the accumulated word as defined by the subsets employed as the accumulated subsets.

15. The method of claim 1 wherein disambiguating is for determining a relative closeness in meaning, further comprising
determining, from the definition elements, the bit mask value of each of a base word and words for comparison;
performing, for each of the words for comparison, an XOR on the bit mask value of the base word and the word for comparison to generate a closeness value;
comparing the closeness values corresponding to each of the words for comparison; and
concluding that the lowest closeness value identifies which of the words for comparison has the closest meaning to the base word.

16. The method of claim 1 further comprising a plurality of definition elements, each word having one definition element with a primary definition element value and at least one definition element with a multiple taxonomy value, the multiple taxonomy value indicative of different contexts of usage for the word, the primary definition element denoted by a predetermined value in a field of the definition element.

17. The method of claim 1 wherein disambiguating is for translating a definition of multiple words though the bitwise operations, further comprising:
identifying the definition element of a first word and a second word for which a translated definition is sought;
performing an XOR on the definition elements of the first and second words to generate a definition value; and
mapping the definition value to find a matching definition element, the matching definition element corresponding to the definition element of the translated definition.

18. The method of claim 1 wherein a result of the bitwise operation equals the definition element of another word describing the usage in context.

19. A method for processing language elements comprising:
receiving a series of words in a natural language;
parsing the series of words to derive an ordered set of words in the natural language, the set of words derived from a natural language usage defining a natural language context of the words in the set of words;
mapping each of the parsed words to a corresponding term in a dictionary of representations of multiple bits and fields of bits, of words in the particular natural language;
mapping each of the identified dictionary terms to at least one definition element, the definition elements defining a record of fields and indicative of the word in context with other words;
processing the mapped definition elements with corresponding fields in the other mapped definition elements from the ordered set of words to identify corresponding contexts of words in the ordered set of words, each of the definition elements identifying a particular definition of a word in the context defined by proximate words, each definition element having a context specific definition;

disambiguating the parsed words by analyzing each of the definition elements of the parsed words with the definition elements of the other parsed words, the analysis operable to determine a particular definition for each of the parsed words in a context of the series of words, disambiguating including:

performing, with a processor, bitwise operations on at least a subset of the fields in the definition elements with corresponding fields in the other definition elements in the word sequence, each of the definition elements indicative of a particular context, the operations for identifying a particular definition element based on the context in the word sequence, the definition elements including bit fields of class, method, and category in the high bits, the method field determining a structure of fields in lower order bits, wherein disambiguating is performed on definition elements of equal category and method fields; and identifying, from the processing, a particular definition element for each of the words applicable to the word in the ordered set of words.

20. The method of claim 19 wherein the at least one definition element further comprises a plurality of definition elements, each of the definition elements corresponding to a mask indicative of significant fields in the definition elements, further comprising:

a primary definition element indicative of a deterministic usage of the word; and at least one secondary definition element indicative of particular contextual usages of the word applicable to the primary definition.

21. The method of claim 20 wherein the mapped dictionary term further maps to at least one definition section, each definition section corresponding to a primary definition of the word having at least one definition element.

22. The method of claim 21 wherein comparison results in an indication of the most significant bit different from another definition element, the location of the most significant bit that differs indicative of the difference in meaning between the words corresponding to the definition elements.

23. The method of claim 21 wherein comparison results in an indication of dissimilar fields between the compared elements, the comparison indicative of a common context of a manner in which the words are related.

24. A data processing device for representing text in a language independent format of multiple bits and fields of bits, comprising:

a processor operable to execute instructions;

a memory responsive to the processor operable to store the instructions;

an interface operable to transfer data between a user device, the processor and the memory, the instructions operable to:

reference a word from a set of words into a dictionary of bitwise representations of words to find a corresponding dictionary term, the set of words derived from a natural language usage defining a natural language context of the words in the set of words;

map the referenced dictionary term to at least one definition element indicative of usage of the word in a specific context, the definition elements defining a record of fields, each of the definition elements identifying a particular definition of a word in the context defined by proximate words, each definition element having a context specific definition;

compare the mapped definition element to the corresponding fields in the definition elements of other words in the set of words, the comparison operative to identify similar contexts between the definition elements;

disambiguate the referenced words by analyzing each of the definition elements of the referenced words with the definition elements of the other referenced words, the analysis operable to determine a particular definition for each of the referenced words in a context of the series of words, disambiguating including:

performing bitwise operations on at least a subset of the fields in the definition elements with corresponding fields in the other definition elements in the set of words, each of the definition elements indicative of a particular context, the operations for identifying a particular definition element based on the context in the set of words, the definition element including bit fields of class, method, and category in the high bits, the method field determining a structure of fields in lower order bits, wherein disambiguating is performed on definition elements of equal category and method fields; and identify, from the comparing, a definition element corresponding to the usage of the word in a context of the set of words.

25. A computer program product having a non-transitory computer readable medium operable to store computer program logic embodied in computer program code encoded thereon for processing language elements comprising:

computer program code for receiving a series of words in a natural language;

computer program code for parsing the series of words to derive an ordered set of words in the natural language, the set of words derived from a natural language usage defining a natural language context of the words in the set of words;

computer program code for mapping each of the parsed words to a corresponding term in a dictionary of bitwise representations of words in the particular natural language;

computer program code for mapping each of the identified dictionary terms to at least one definition element, the definition elements indicative of the word in context with other words, each of the definition elements defining a record of fields and identifying a particular definition of a word in the context defined by proximate words, each definition element having a context specific definition;

computer program code for processing the mapped definition elements with corresponding fields in the other mapped definition elements from the ordered set of words to identify corresponding contexts of words in the ordered set of words;

computer program code for identifying, from the processing, a particular definition element for each of the words applicable to the word in the ordered set of words;

computer program code for comparing the referenced words to the dictionary, the dictionary indicative of definitions of the referenced words, each word having at least one definition, the definitions corresponding to different contexts of the referenced words; and computer program code for disambiguating the referenced words by analyzing each of the definition elements of the referenced words with the definition elements of the other referenced words, the analysis operable to determine a particular definition for each of the referenced words in a context of the set of words, disambiguating including: performing bitwise operations on at least a subset of the fields in the definition elements with corresponding fields in the other definition elements in the word sequence, each of the definition elements indicative of a particular context, the operations for identifying a particular definition element based on the context in the set of words, the definition element including bit fields of class, method, and category in the high bits, the method field determining a structure of fields in lower order bits, wherein disambiguating is performed on definition elements of equal category and method fields; and computer program code for identifying, from the comparing, a particular definition element for each of the words applicable to the word in the ordered set of words.

26. A machine vocabulary processor for translation independent of a native natural language comprising:

means for generating a bitwise language representation by classifying language elements according to a predetermined set of rules, the bitwise language representation having a plurality of bitwise definition elements corresponding to words in a particular usage context;

means for parsing the words to identify the definition elements, each of the definition elements having fields;

means for receiving a natural language sentence in a first natural language, the natural language sentence comprising a series of words, the series of words derived from a natural language usage defining a natural language context of the words in the set of words;

means for disambiguating the referenced words by analyzing each of the definition elements of the referenced words with the definition elements of the other referenced words, the analysis operable to determine a particular definition for each of the referenced words in the context of the series of words, disambiguating including:

performing bitwise operations on at least a subset of the fields in the definition elements with corresponding fields in the other definition elements in the set of words, each of the definition elements indicative of a particular context, the operations for identifying a particular definition element based on the context in the set of words, the definition element includes bit fields of class, method, and category in the high bits, the method field determining a structure of fields in lower order bits, wherein disambiguating is performed on definition elements of equal category and method fields;

means for computing a series of definition elements corresponding to each of the words in the first natural language sentence, the definition elements indicative of each of the words in the context of the received natural language sentence; and means for determining, from the computed series of definition elements, a second set of language elements in a second natural language, the definition elements selected in a manner that preserves the specific context from the first natural language sentence, each of the definition elements identifying a particular definition of a word in the context defined by proximate words, each definition element having a context specific definition.

* * * * *